(12) United States Patent
Jeon et al.

(10) Patent No.: US 9,586,457 B2
(45) Date of Patent: Mar. 7, 2017

(54) ACTIVE ROTARY STABILIZER AND STABILIZER BAR LINK ASSEMBLY FOR VEHICLE

(71) Applicant: HYUNDAI MOBIS Co., Ltd., Yongin-si, Gyeonggi-do (KR)

(72) Inventors: Jin Moo Jeon, Yongin-si (KR); Jun Sung Park, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/862,272

(22) Filed: Sep. 23, 2015

(65) Prior Publication Data
US 2016/0089951 A1  Mar. 31, 2016

(30) Foreign Application Priority Data

Sep. 25, 2014 (KR) .................. 10-2014-0128411
Oct. 2, 2014 (KR) .................. 10-2014-0132991
Oct. 29, 2014 (KR) .................. 10-2014-0148540

(51) Int. Cl.
*B60G 21/055* (2006.01)

(52) U.S. Cl.
CPC ..... *B60G 21/0555* (2013.01); *B60G 21/0556* (2013.01); *B60G 2202/135* (2013.01); *B60G 2202/442* (2013.01); *B60G 2204/4191* (2013.01)

(58) Field of Classification Search
CPC ............ B60G 21/0555; B60G 21/0556; B60G 2202/135; B60G 2202/442; B60G 2204/4191
See application file for complete search history.

(56) References Cited

U.S. PATENT DOCUMENTS

| 6,425,585 | B1* | 7/2002 | Schuelke | B60G 17/0162 280/124.106 |
|---|---|---|---|---|
| 2005/0167932 | A1* | 8/2005 | Munster | B60G 21/0555 280/6.15 |
| 2005/0236793 | A1* | 10/2005 | Taneda | B60G 21/0555 280/124.107 |
| 2006/0212199 | A1* | 9/2006 | Urababa | B60G 17/0162 701/38 |
| 2009/0224493 | A1* | 9/2009 | Buma | B60G 17/0162 280/5.511 |
| 2010/0072725 | A1* | 3/2010 | Woellhaf | B60G 21/0555 280/124.107 |
| 2010/0113206 | A1* | 5/2010 | Wang | B60G 21/0555 475/180 |
| 2011/0024223 | A1* | 2/2011 | Konrad | B62D 5/008 180/444 |
| 2012/0181848 | A1* | 7/2012 | Makino | B60K 7/0007 301/6.5 |

* cited by examiner

*Primary Examiner* — Drew Brown
(74) *Attorney, Agent, or Firm* — Paratus Law Group, PLLC

(57) ABSTRACT

The present invention relates to an active rotary stabilizer and a stabilizer bar link assembly for a vehicle, which particularly may increase a degree of design freedom for a lower side of a vehicle body, improve ride comfort for a passenger, enhance durability of an actuator, and reduce the occurrence of noise caused by a backlash when the actuator is operated.

9 Claims, 25 Drawing Sheets

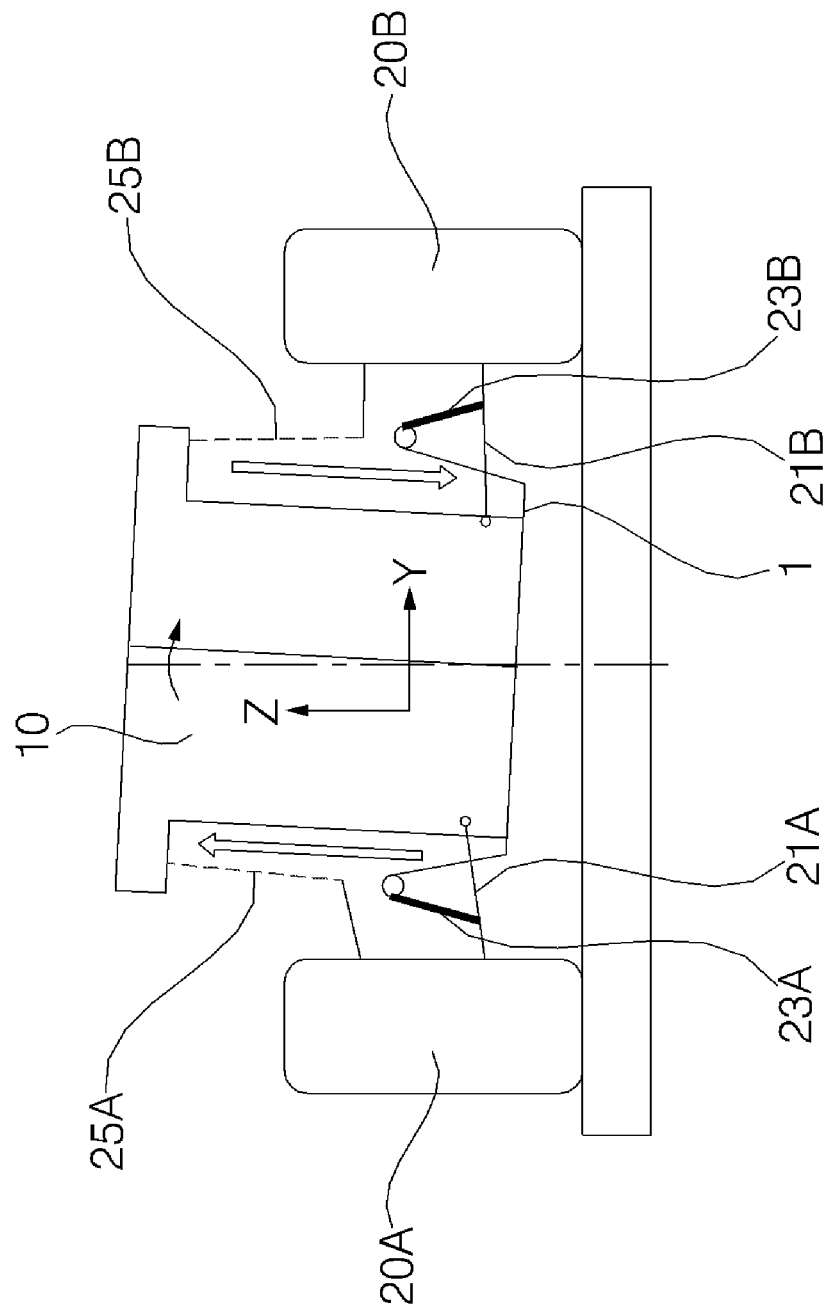

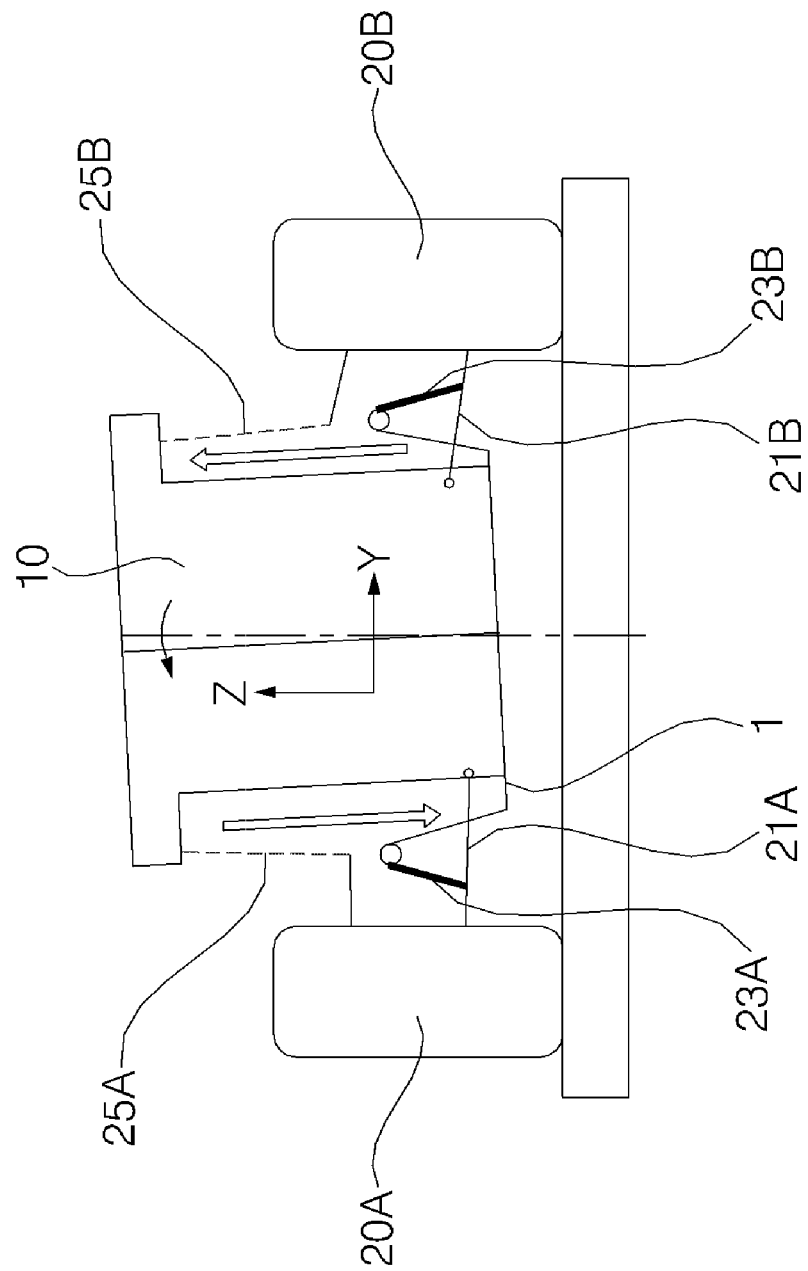

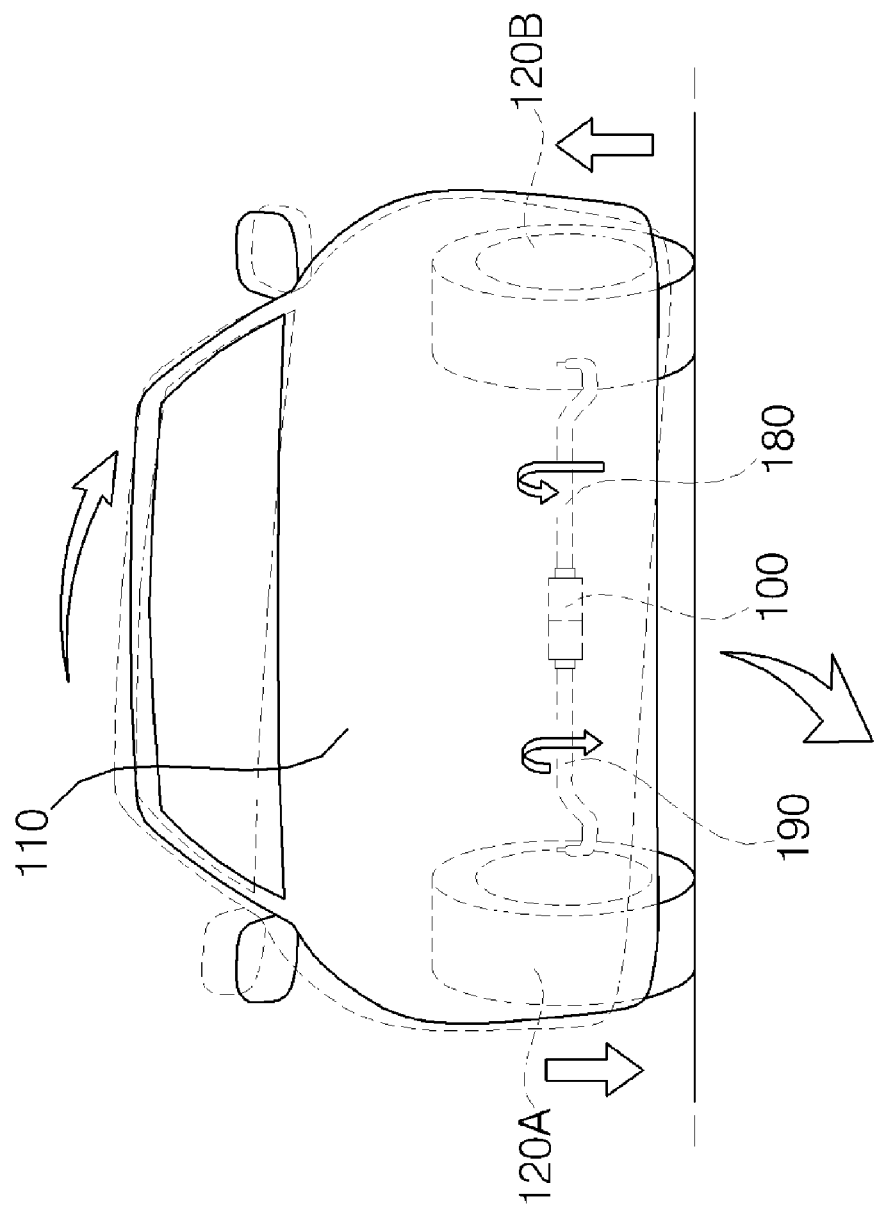

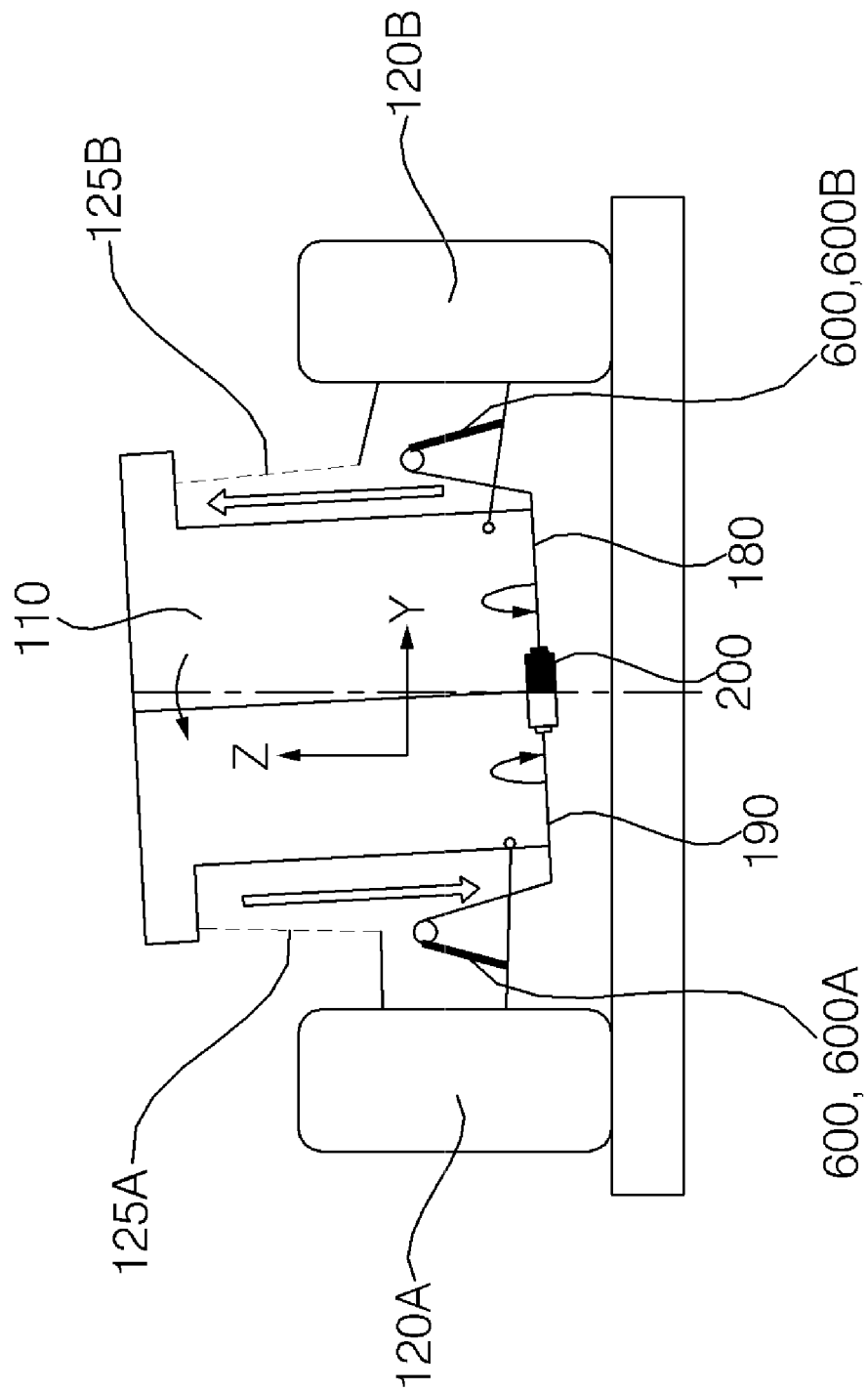

ACTIVE ROTARY STABILIZER AND STABILIZER BAR LINK ASSEMBLY FOR VEHICLE

CROSS-REFERENCE TO RELATED APPLICATIONS

The present application claims priority to Korean Patent Application Number 10-2014-0128411 filed Sep. 25, 2014, Korean Patent Application Number 10-2014-0132991 filed Oct. 2, 2014, Korean Patent Application Number 10-2014-0148540 filed Oct. 29, 2014, the entire contents of which the application is incorporated herein for all purposes by this reference.

TECHNICAL FIELD

The present invention relates to an active rotary stabilizer and a stabilizer bar link assembly for a vehicle, and more particularly, to an active rotary stabilizer and a stabilizer bar link assembly for a vehicle which may actively stabilize the vehicle when swaying in left and right directions occurs while the vehicle is traveling.

BACKGROUND

In general, as means for absorbing vibration generated from a road surface while a vehicle travels, vehicle wheels serve to primarily mitigate vibration, and a suspension system serves to secondarily absorb high vibration that is transmitted through the vehicle wheels, thereby providing occupants with more comfortable riding quality.

An active stabilizer apparatus is provided to minimize sway of the vehicle in left and right directions, which is caused due to vertical road waviness of the road surface and when the vehicle turns left and right while traveling.

In the related art, a stabilizer bar, which is manufactured by using a single member, is mounted to extend in a lateral direction of the vehicle body, and through roll stiffness that the stabilizer bar autonomously has, the stabilizer bar mitigates rolling motion of the vehicle body, which occurs due to a change in relative behavior posture between left and right suspension systems when the vehicle travels, thereby generally stabilizing the posture of the vehicle body.

The stabilizer bar is manufactured through processes of cutting a single round bar or a pipe member to an appropriate length, forming and processing the cut member so that the cut member has a shape and stiffness required for the stabilizer bar, and then performing heat treatment, shot peening, painting, and the like.

However, the stabilizer bar, which is manufactured by using a single member as described above, is a passive stabilizer bar that is easily manufactured at low production costs. However, since the stabilizer bar controls the rolling motion of the vehicle body by using inherent roll stiffness that the stabilizer bar autonomously has, as described above, there is a problem in that it is difficult to effectively inhibit all of the various types of rolling motion that occur when the vehicle travels.

Therefore, recently, an active rotary stabilizer (ARS), which has an actuator to adjust roll stiffness of the stabilizer bar depending on the circumstances, is widely used.

An active rolling stabilizer for a vehicle is configured so that two half-stabilizer bars are coupled at both ends of an actuator, and adjusts roll stiffness of the stabilizer bar by operating the actuator depending on a degree of the rolling motion of the vehicle, thereby stabilizing a posture of the vehicle.

FIG. 1 is a front view of a vehicle body having a stabilizer bar that is manufactured by using a single member, FIGS. 2A to 2C are conceptual views illustrating a process of operating a passive stabilizer for a vehicle according to the related art, FIG. 3 is a schematic view illustrating a state in which an actuator and a stabilizer bar, which are constituent elements of an active rotary stabilizer for a vehicle according to the related art, are connected, FIG. 4 is an exploded perspective view illustrating a torsion damping unit that is a constituent element of the actuator in FIG. 3, and FIG. 5 is a side view illustrating various examples of a shape of an outer circumferential surface of a spline gear formed on an outer circumferential surface of a rotary stabilizer bar.

As illustrated in FIG. 1, a passive stabilizer for a vehicle according to the related art has a stabilizer bar 1 that is manufactured by using a single member and disposed to be elongated in a vehicle width direction toward left and right wheels 20A and 20B at a lower side of a vehicle body. Rolling motion of a vehicle body 10, which occurs when the vehicle turns left and right while traveling, is inhibited by an action of roll stiffness that the stabilizer bar autonomously has.

FIGS. 2A to 2C are conceptual views illustrating a process of operating the passive stabilizer for a vehicle according to the related art, and more specifically, FIG. 2A schematically illustrates a state in which the vehicle travels straight, FIG. 2B schematically illustrates a state in which the vehicle turns right when viewed from the front side, and FIG. 2c schematically illustrates a state in which the vehicle turns left when viewed from the front side.

The stabilizer bar 1 is disposed to be elongated in left and right directions toward the left and right wheels 20A and 20B at the lower side of the vehicle body 10, and coupled to left and right lower arms 21A and 21B by means of stepped bar links 23A and 23B, and the vehicle body 10 is configured to absorb traveling vibration transmitted from the left and right wheels 20A and 20B by means of left and right suspension systems 25A and 25B.

Referring to FIGS. 2A to 2C in more detail, when the vehicle travels straight, the vehicle body 10 does not tilt in any direction, as illustrated in FIG. 2A, such that nearly no roll stiffness is applied by the stabilizer bar 1. When the vehicle turns right, the vehicle body 10 tilts leftward due to inertia, as illustrated in FIG. 2B, and in this case, the stabilizer bar 1 provides, by its own roll stiffness, force to maintain the vehicle body 10 to the right direction. When the vehicle turns left, the vehicle body 10 tilts rightward due to inertia, as illustrated in FIG. 2C, and in this case, the stabilizer bar 1 provides, by its own roll stiffness, force to maintain the vehicle body 10 to the left direction.

As described above, rolling motion of the vehicle body 10 may be controlled to a certain degree by using the stabilizer bar 1 that is manufactured by using a single member, but there is a problem in that it is impossible to cope with various changes in traveling states. Therefore, an active rotary stabilizer 50 for a vehicle has been developed, as described above.

As illustrated in FIG. 3, in the active rotary stabilizer 50 for a vehicle according to the related art, a drive unit 60, which is configured as a motor, is provided at one side in a housing 55, and a reduction unit 70, which reduces rotational force transmitted from the drive unit 60, is provided at the other side in the housing 55.

Here, one stabilizer bar (hereinafter, referred to as "fixed stabilizer bar 80") of the aforementioned half-stabilizer bars is welded on a drive unit cover 85 that is disposed to support a shaft of the motor while surrounding the housing 55, at the outside of the housing 55 which is adjacent to the drive unit 60. The other stabilizer bar (hereinafter, referred to as "rotary stabilizer bar 90") is connected to a final output end 71 of the reduction unit 70 in a spline gear connection manner, at the outside of the housing 55 which is adjacent to the reduction unit 70, and receives predetermined rotational force from the drive unit 60 via the reduction unit 70.

Although not illustrated in FIG. 3, in the reduction unit 70, while a sun gear receives rotational force provided from the motor shaft and rotates, a plurality of planet gears around the sun gear is engaged with the sun gear and revolves around the sun gear, and the plurality of planet gears, which revolves around the sun gear, is engaged with a ring gear type housing that surrounds the plurality of planet gears, and serves to reduce rotational force while rotating the ring gear type housing.

The reduction unit 70 having the aforementioned configurations has two sets of sun gears and planet gears which are continuously disposed, thereby forming a reduction ratio to a degree at which rotational force of the drive unit 60 may be uniformly distributed to one side and the other side of the housing 55.

However, in the case of a reduction mechanism using a planetary gear set like an example of the active rotary stabilizer 50 for a vehicle according to the related art, a reduction ratio may be obtained to a certain degree by using the planetary gear set, but there are problems in that this reduction mechanism is not suitable when a higher reduction ratio is required, and a volume thereof needs to be increased in proportion to the required reduction ratio in order to obtain a higher reduction ratio.

That is, even in the case of the aforementioned example of the active rotary stabilizer 50 for a vehicle according to the related art, the planetary gear reduction mechanisms are continuously arranged in two stages to form a required reduction ratio, but the arrangement of the reduction mechanisms in multiple stages greatly degrades efficiency, requires repair and management to devices, and requires separate fixing means for fixing the sun gear and the planet gears, and as a result, there are problems in that it is very inconvenient to fix the sun gear and the planet gears, and the number of working processes is increased as the process of fixing the sun gear and the planet gears is required, and an overall length of an entire product is lengthened, which causes a great deterioration in degree of freedom when designing a complicated lower structure of the vehicle body.

Meanwhile, there is no major problem when rotational force generated by the drive unit 60 is normally transmitted to the fixed stabilizer bar 80 and the rotary stabilizer bar 90 as predetermined torsional force, but impact occurs when reversed torsional force is transmitted to an actuator through the left and right wheels when any one of the left and right wheels passes over an irregular object such as a sinkhole in a road surface or a speed bump while the vehicle is traveling. Therefore, as illustrated in FIG. 4, various types of damping means may be provided in the housing 55 in order to attenuate the impact.

As illustrated in FIG. 4, a damping means 30 in the related art may include a damping housing 31 which has an annular opening and a plurality of receiving ribs 33 that is formed in an annular shape on an inner circumferential surface of the damping housing 31, and shock absorbing pieces 35 which are inserted and positioned between the receiving ribs 33 of the damping housing 31 to absorb impact transmitted from the outside.

However, the active rotary stabilizer for a vehicle according to the related art has a problem in that an overall length of the actuator is increased because the damping means 30 is provided in the housing of the actuator. Essentially, the actuator has a complicated configuration because a predetermined space is at least needed at the lower side of the vehicle body to allow the housing of the actuator to rotate itself, and a mounting unit needs to be provided to guide the rotation of the fixed stabilizer bar and the rotary stabilizer bar, which are connected to left and right sides of the actuator, respectively, and to allow the fixed stabilizer bar and the rotary stabilizer bar to be coupled to the vehicle body. However, the aforementioned increase in overall length of the actuator further complicates a structure of the lower side of the vehicle body in which the actuator is disposed, which leads to a problem that severely damages a degree of design freedom for components.

In addition, in the active rotary stabilizer for a vehicle according to the related art, as illustrated in FIG. 5, the final output end 71 to which the rotary stabilizer bar 90 is connected is provided in the form of an insertion hole 75 outside the ring gear type housing of the reduction unit 70, and the rotary stabilizer bar 90 is inserted into the final output end 71, which is formed in the form of the insertion hole 75, and coupled to the final output end 71 in the spline gear connection manner. A coupling nut 95 is coupled to a tip portion of the final output end 71 from which the rotary stabilizer bar 90 is exposed to the outside of the final output end 71 so as to exert predetermined coupling force in an axial direction of the rotary stabilizer bar 90 inserted into and coupled to the final output end 71, thereby preventing withdrawal of the rotary stabilizer bar 90 and reducing clearance when the spline gears mesh with each other.

However, in the case of the connection manner of the rotary stabilizer bar 90 according to the related art which is configured as described above, since the rotary stabilizer bar 90 is coupled to the reduction unit 70 in the spline gear connection manner, there is a problem in that noise occurs due to a backlash at the moment when rotational force with high torque is transmitted from the drive unit 60 because of clearance between spline gear teeth 73 formed on an inner circumferential surface of the final output end 71 and spline gear teeth 93 formed on an outer circumferential surface of the rotary stabilizer bar 90. This problem is caused because rotational force with high torque generated by the drive unit 60 exceeds coupling force of the coupling nut 95.

As a countermeasure, unlike a case in which a helix angle is applied so that the respective gear teeth 93 are in parallel in a longitudinal direction as illustrated in FIG. 5A, a method of applying a helix angle so that the respective gear teeth 93 has a predetermined inclination angle $\alpha$ in the longitudinal direction as illustrated in FIG. 5B has been proposed, but in the case of applying the helix angle so that the respective gear teeth 93 has a predetermined inclination angle $\alpha$ as illustrated in FIG. 5B, there is a problem in that it is difficult to disassemble the final output end 71 of the reduction unit 70 and the rotary stabilizer bar 90.

SUMMARY

The present invention has been made in an effort to provide an active rotary stabilizer for a vehicle, capable of reducing an overall length of a product, and obtaining an efficient reduction ratio.

The present invention also has been made in an effort to provide an active rotary stabilizer for a vehicle, capable of reducing a weight of the entire vehicle body by reducing an overall length of a product so as to reduce thicknesses of a fixed stabilizer bar and a rotary stabilizer bar.

In addition, the present invention also has been made in an effort to provide an active rotary stabilizer for a vehicle, capable of reducing the occurrence of noise caused by a backlash when an actuator is operated.

Furthermore, the present invention also has been made in an effort to provide a stabilizer bar link assembly of an active rotary stabilizer for a vehicle, in which an anti-torque prevention unit is provided in a stabilizer bar link in order to effectively mitigate reversed torsional force transmitted from the outside without increasing an overall length of an actuator, thereby increasing a degree of design freedom for a lower structure of a vehicle body, and enhancing a damping function.

An exemplary embodiment of the present invention provides an active rotary stabilizer for a vehicle, including: a housing which has a predetermined space therein; a first reduction unit which is provided in the housing, is disposed to be adjacent to the drive unit, receives rotational force from the drive unit, and primarily reduces the rotational force at a predetermined ratio; a second reduction unit which is provided at the other side in the housing, receives the primarily reduced rotational force from an output portion of the first reduction unit, and secondarily reduces the rotational force at a predetermined ratio; a fixed stabilizer bar which is welded on a drive unit cover that is coupled to surround the drive unit at one side of the housing adjacent to the drive unit, rotates in conjunction with the housing, and provides predetermined torsional force to one side of a vehicle body of a vehicle that turns; and a rotary stabilizer bar which is coupled to an output end that protrudes toward the other side of the housing adjacent to the second reduction unit, rotates relative to the housing, and provides predetermined torsional force to the other side of the vehicle body of the vehicle that turns.

The first reduction unit may be any one of a cycloid reduction unit using a cycloid gear and a planetary gear reduction unit using a planetary gear set, and the second reduction unit may be a reduction unit of the cycloid reduction unit and the planetary gear reduction unit which is different from the first reduction unit.

The cycloid reduction unit may include: an eccentric shaft which has one end connected to the rotor, and a pair of eccentric bodies that is provided at the other end of the eccentric shaft and is eccentrically and axially connected to each other so as to be symmetrical at 180 degrees; a pair of cycloid discs which has cycloid teeth formed along outer circumferential surfaces of the cycloid discs, a plurality of disc moving holes penetratively formed in the axial direction along the same circumference, and fixing holes that are penetratively formed at centers of the cycloid discs in the axial direction so that the pair of eccentric bodies of the eccentric shaft is sequentially inserted into and rotatably supported by the fixing holes; an output shaft which has a plurality of input legs that is formed at one side of the output shaft and inserted into the disc moving holes, and an output sun gear portion that is formed at the other side of the output shaft, extends to a side where the planetary gear reduction unit is provided, and is rotated at a reduced speed along with the rotation of the pair of cycloid discs; and an internal teeth portion which has internal teeth that are formed on an inner surface of the housing and engaged with the cycloid teeth of the pair of cycloid discs.

The number of cycloid teeth formed on the pair of cycloid discs may be one less than the number of internal teeth of the internal teeth portion.

The eccentric shaft and the pair of cycloid discs may perform rolling motion by means of a roller bearing interposed between the fixing holes.

A length of the cycloid reduction unit may be shorter than a length of the planetary gear reduction unit.

Rotational force provided from the rotor may be primarily reduced by the cycloid reduction unit, secondarily reduced by the planetary gear reduction unit, and then output.

Another exemplary embodiment of the present invention provides an active rotary stabilizer for a vehicle, including: a housing which has a predetermined space therein; a drive unit which includes a stator that is fixed to be adjacent to an inner circumferential surface at one side in the housing, and a rotor that is rotated in the stator by being supplied with electric power; a planetary gear reduction unit which is provided in the housing, is disposed to be adjacent to the drive unit, receives rotational force from the drive unit, and primarily reduces the rotational force at a predetermined ratio; a cycloid reduction unit which is provided at the other side in the housing, receives the primarily reduced rotational force from an output shaft of the planetary gear reduction unit, and secondarily reduces the rotational force at a predetermined ratio; a fixed stabilizer bar which is welded on a drive unit cover, which is coupled to surround the drive unit at one side of the housing adjacent to the drive unit, rotates in conjunction with the housing, and provides predetermined torsional force to one side of a vehicle body of a vehicle that turns; and a rotary stabilizer bar which is coupled to an output end that protrudes toward the other side of the housing adjacent to the cycloid reduction unit, rotates relative to the housing, and provides predetermined torsional force to the other side of the vehicle body of the vehicle that turns.

The planetary gear reduction unit may include: a sun gear which protrudes from a center at the other end of the output shaft of the cycloid reduction unit toward the other side in the housing at a predetermined length, is rotated integrally with the output shaft, and has gear teeth formed on an outer circumferential surface thereof; a plurality of planet gears which has gear teeth that mesh with the gear teeth of the sun gear, is disposed along an outer circumference of the sun gear, and revolves around the sun gear in accordance with the rotation of the sun gear; a carrier unit which simultaneously receives rotational force from the plurality of planet gears, and obtains a reduction ratio at which the carrier unit is rotated at the revolution speed of the plurality of planet gears; and a planetary gear housing which is disposed to surround the sun gear, the plurality of planet gears, and the carrier unit.

Rotational force provided from the rotor may be primarily reduced by the planetary gear reduction unit, secondarily reduced by the cycloid reduction unit, and then output.

Still another exemplary embodiment of the present invention provides an active rotary stabilizer for a vehicle, including: a housing which has a predetermined space therein; a drive unit which is disposed at one side in the housing and operated to generate predetermined rotational force; a reduction unit which is disposed at the other side in the housing and reduces rotational force transmitted from the drive unit; a fixed stabilizer bar which is coupled, by welding, to an outer portion of the housing at a side where the drive unit is provided, receives relative rotational force between the drive unit and the reduction unit, and transmits predetermined torsional force to one side of a vehicle body; a rotary stabilizer bar which is inserted from the outside into the inside of the housing at a side where the reduction unit is provided, receives relative rotational force between the drive unit and the reduction unit, and transmits predetermined torsional force to the other side of the vehicle body; and a backlash reducing unit which is provided between the rotary stabilizer bar and the reduction unit, and reduces a backlash caused by rotation due to a spline gear connection between the rotary stabilizer bar and the reduction unit.

Here, the reduction unit may include: a sun gear which is rotated by receiving the rotational force provided by the drive unit; a plurality of planet gears which meshes with an outer circumference of the sun gear and revolves around the sun gear; and a planetary gear housing which accommodates the sun gear, meshes with the plurality of planet gears, and rotates in one direction, and the backlash reducing unit may be disposed between the rotary stabilizer bar and the planetary gear housing.

In addition, the planetary gear housing may include an output end which extends to the outside of the housing, the rotary stabilizer bar may be inserted into an insertion hole formed at the output end and coupled to the insertion hole in a spline gear connection manner, and the backlash reducing unit may be positioned between a tip portion of the rotary stabilizer bar and a bottom surface in the insertion hole.

In addition, the backlash reducing unit may include: a first serrated portion which is provided on the tip portion of the rotary stabilizer bar; and a second serrated portion which is provided on the bottom surface in the insertion hole.

In addition, the first serrated portion and the second serrated portion may be a plurality of gear teeth that meshes with each other.

In addition, the first serrated portion and the second serrated portion may be provided to be spaced apart from each other at a predetermined distance when the planetary gear housing is rotated in a direction in which rotational force of the drive unit is transmitted to the rotary stabilizer.

In addition, the plurality of gear teeth, which constitutes the first serrated portion and the second serrated portion, each may include: inclined surfaces which allow the first serrated portion and the second serrated portion to be spaced apart from each other at a predetermined distance when the planetary gear housing is rotated in a direction in which rotational force of the drive unit is transmitted to the rotary stabilizer; and vertical surfaces which connect bottom portions of the inclined surfaces that are adjacent to tips of the inclined surfaces.

In addition, the backlash reducing unit may be separately manufactured and interposed between the rotary stabilizer bar and the planetary gear housing.

Yet another exemplary embodiment of the present invention provides a stabilizer bar link assembly of an active rotary stabilizer for a vehicle, the stabilizer bar link assembly including: an upper link which has one end that is connected to a fixed stabilizer bar or a rotary stabilizer bar that generates torsional force by receiving predetermined rotational force from an actuator disposed between left and right wheels of a vehicle body, and the other end that extends downward at a predetermined length; a lower link which has one end that is disposed to be adjacent to the other end of the upper link and receives torsional force transmitted from the fixed stabilizer bar or the rotary stabilizer bar to the upper link, and the other end that is connected to any one of left and right lower arms connected to the left and right wheels of the vehicle body; and an anti-torque prevention unit which is disposed to accommodate both of the other end of the upper link and the one end of the lower link, and prevents reversed torsional force from being reversely transmitted from the left and right lower arms.

Here, the anti-torque prevention unit may include: a link housing which accommodates both of the other end of the upper link and the one end of the lower link; and a shock absorbing member which is disposed in the link housing and absorbs transmission force transmitted through the upper link and the lower link.

In addition, catching portions, which have larger outer diameters than the other end of the upper link and the one end of the lower link, may be formed at the other end of the upper link and the one end of the lower link, and a cylinder portion in which the catching portions of the upper link and the lower link are moved like a piston may be formed in the link housing.

In addition, the shock absorbing member may be disposed in the cylinder portion.

In addition, the shock absorbing member may include: compressive rubber which is disposed between the catching portion of the upper link and the catching portion of the lower link; and tensile rubber which is disposed on an outer circumferential surface of the lower link and disposed to be caught by an inner wall at one side of the cylinder portion.

In addition, a through portion, which is in communication with the cylinder portion and through which the lower link passes, may be further formed in the link housing, and the lower link may be connected to the through portion in a spline gear connection manner.

In addition, the cylinder portion may be formed at one end of the link housing which is close to the upper link.

In addition, the lower link may be coupled to pass through the cylinder portion and protrude from the other end of the link housing which is opposite to the cylinder portion, and the upper link may be coupled to an inner circumferential surface of the cylinder portion in a threaded connection manner.

In addition, at one end of the link housing, an O-ring, which is disposed on the catching portion of the upper link, may prevent an inflow of foreign substances, and at the other end of the link housing, a sealing ring, which is interposed between the link housing and an outer circumferential surface of the lower link, may prevent an inflow of foreign substances.

In addition, the lower link may be rotatably connected to the lower arm by means of a rotary bushing.

According to the exemplary embodiment of the active rotary stabilizer and the stabilizer bar link assembly for a vehicle according to the present invention, the following various effects may be achieved.

First, an overall length of a product is reduced, thereby improving a degree of design freedom, which may simplify complicated design of a lower portion of a vehicle body.

Second, since an efficient reduction ratio may be obtained, it is not necessary to provide a drive unit exhibiting excessively high output and RPM, and it is possible to improve riding quality for an occupant.

Third, a thickness of the stabilizer bar is reduced by reducing an overall length of a product, thereby reducing an overall weight of the vehicle body.

Fourth, the backlash reducing unit is positioned between the rotary stabilizer bar and the reduction unit, thereby preventing the occurrence of noise caused by a backlash between the rotary stabilizer bar and the reduction unit that are coupled in a spline gear connection manner.

Fifth, a position of the anti-torque prevention unit, which serves to absorb reversed torsional force transmitted from an uneven road surface when the vehicle travels, is changed from an actuator, which is a position in the related art, into the stabilizer bar link assembly, thereby preventing an overall length of the actuator from being increased, and improving a degree of design freedom for a lower structure of the vehicle body.

Sixth, loads transmitted from a road surface is effectively absorbed by the shock absorbing member interposed between the upper link and the lower link, thereby stabilizing ride comfort for a passenger seated in the vehicle, and improving durability of the actuator that generates drive force by operating the motor.

BRIEF DESCRIPTION OF THE DRAWINGS

FIGS. 2A to 2C are conceptual views illustrating a process of operating a passive stabilizer for a vehicle according to the related art.

FIG. 6 is a front view of a vehicle body for explaining an operation of an active rotary stabilizer for a vehicle according to the present invention.

FIGS. 7A to 7C are conceptual views illustrating a process of operating the active rotary stabilizer for a vehicle.

DETAILED DESCRIPTION

Hereinafter, exemplary embodiments of an active rotary stabilizer for a vehicle according to the present invention will be described in detail with reference to the accompanying drawings.

Figure 1:
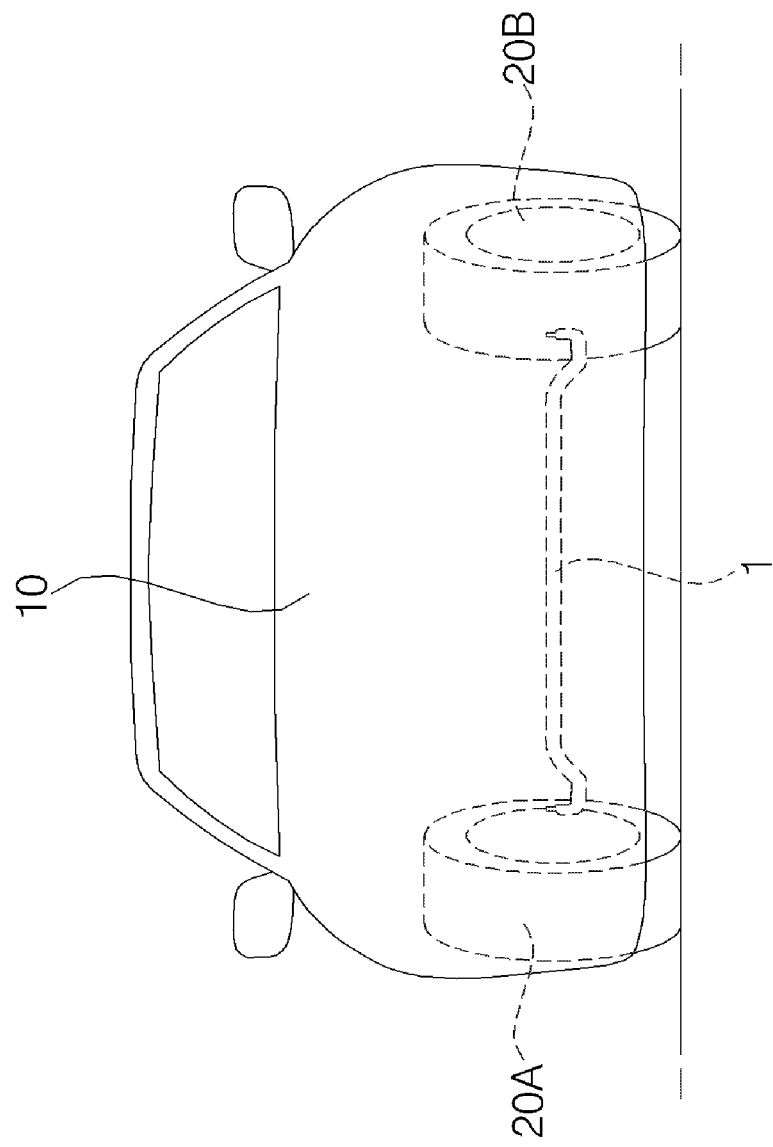
FIG. 1 is a front view of a vehicle body having a stabilizer bar that is manufactured by using a single member.
Figure 2A:
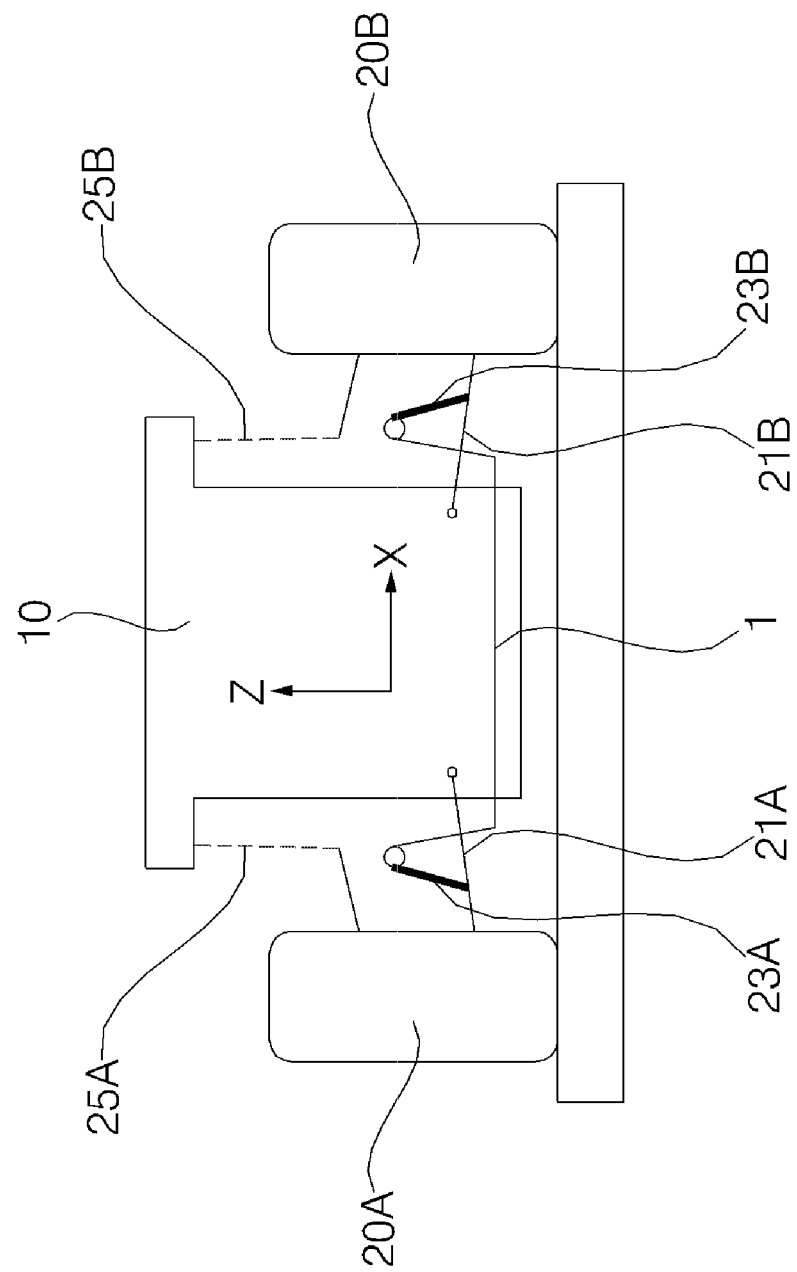
Figure 3:
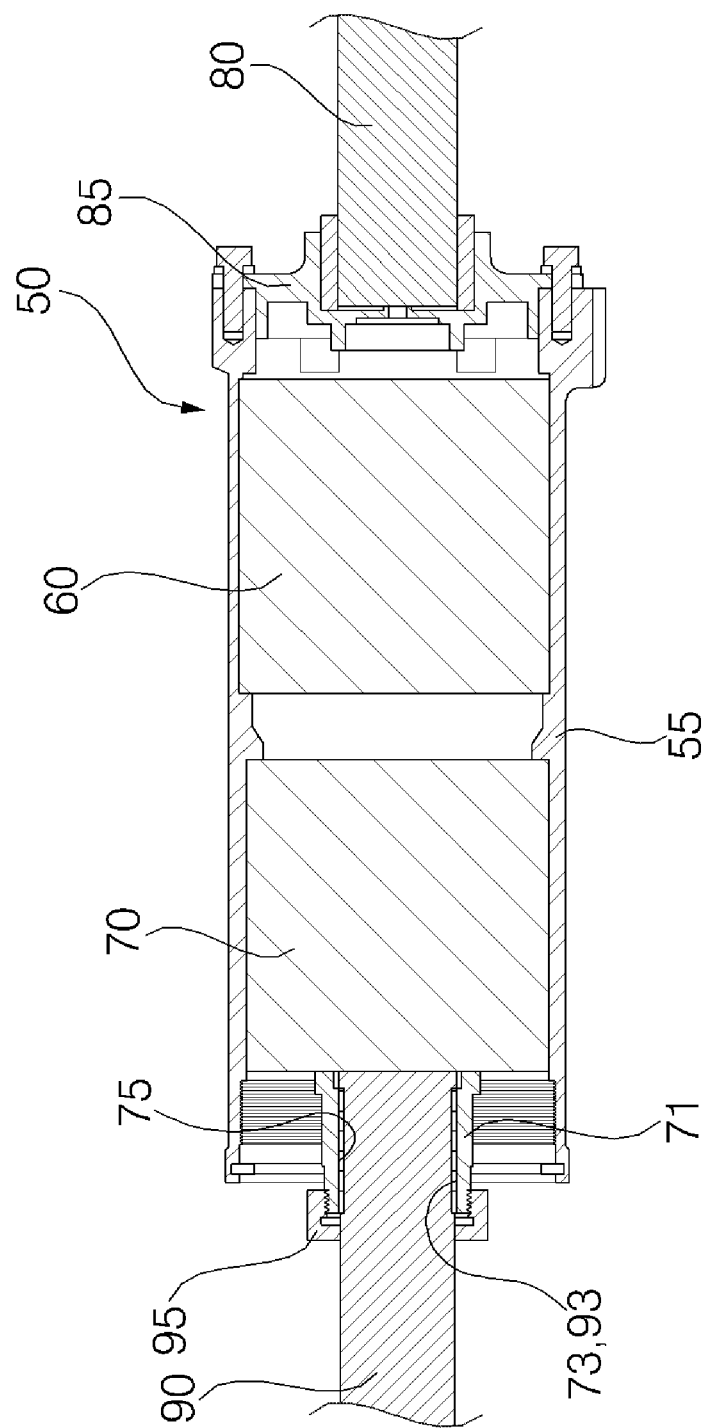
FIG. 3 is a schematic view illustrating a state in which an actuator and a stabilizer bar, which are constituent elements of an active rotary stabilizer for a vehicle according to the related art, are connected.
Figure 4:
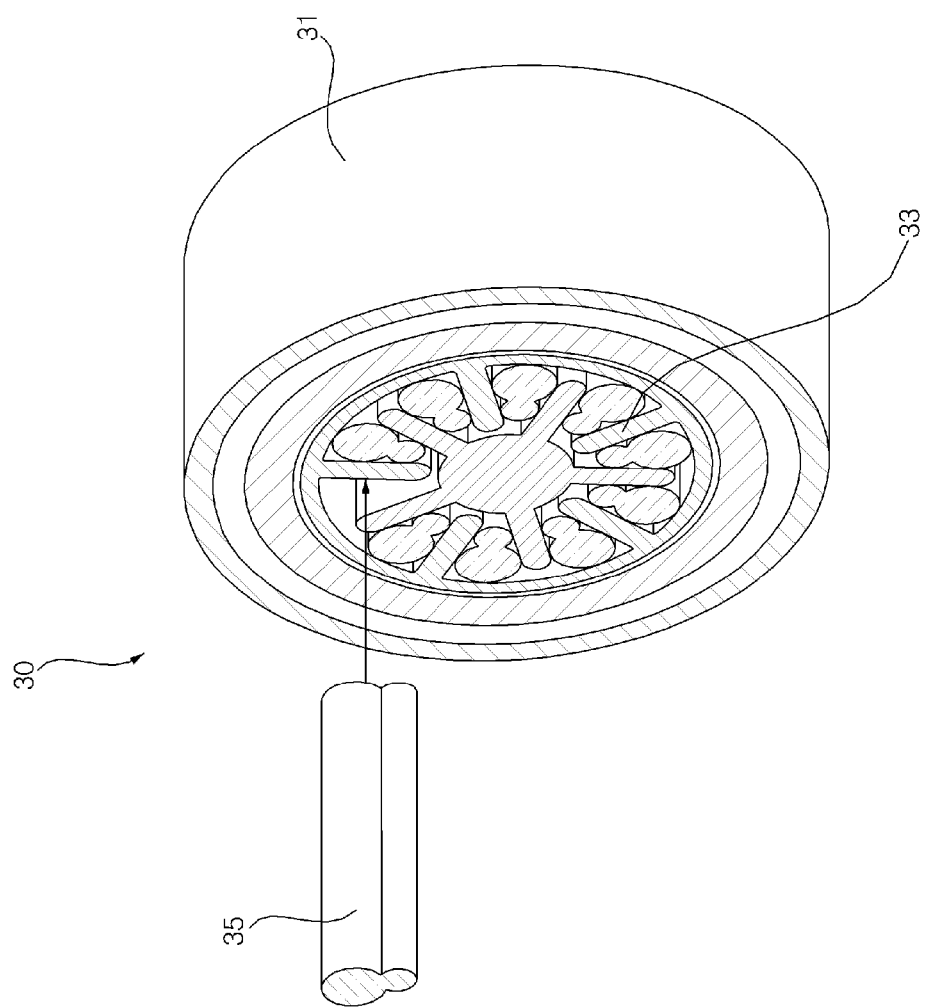
FIG. 4 is an exploded perspective view illustrating a torsion damping unit which is a constituent element of the actuator in FIG. 3.
Figure 5:
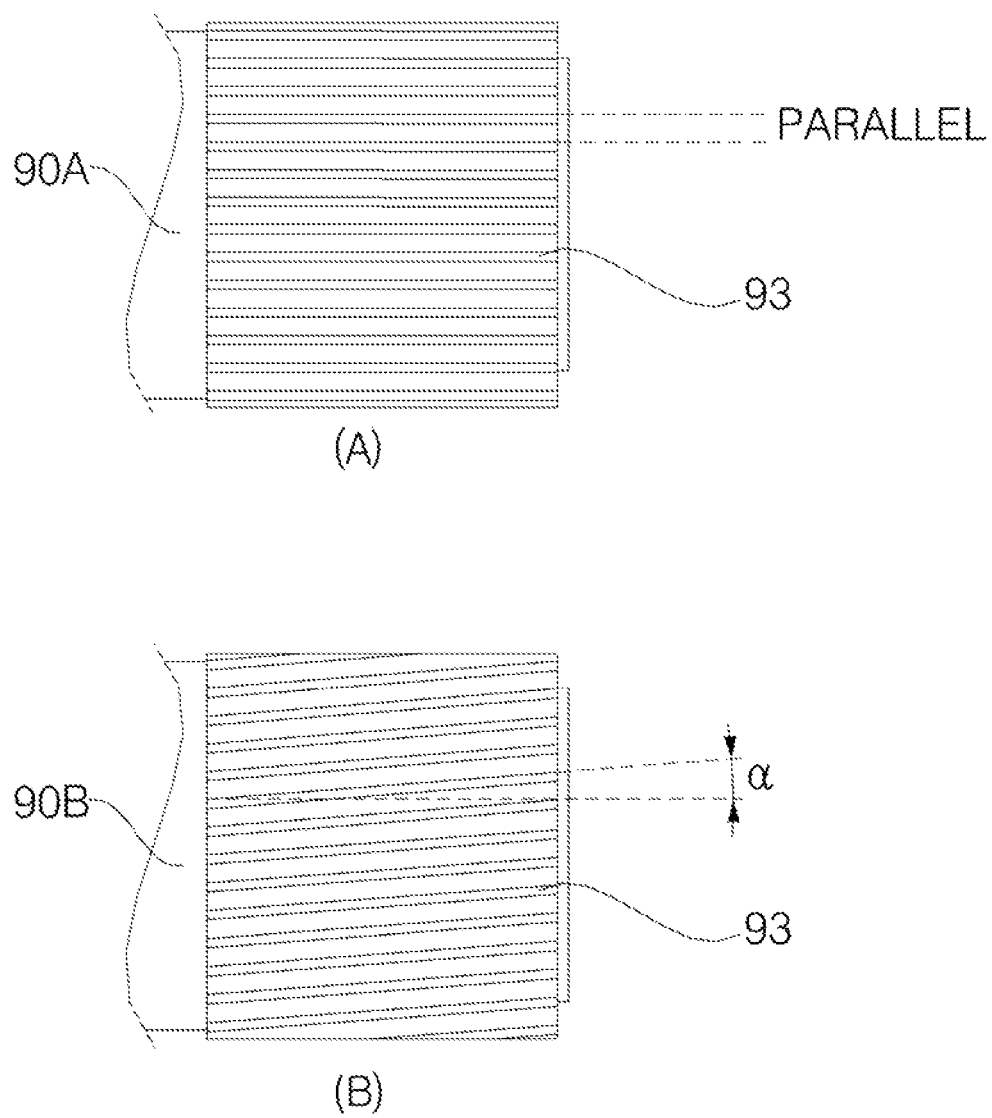
FIG. 5 is a side view illustrating various examples of a shape of an outer circumferential surface of a spline gear formed on an outer circumferential surface of a rotary stabilizer bar.
Figure 7A:
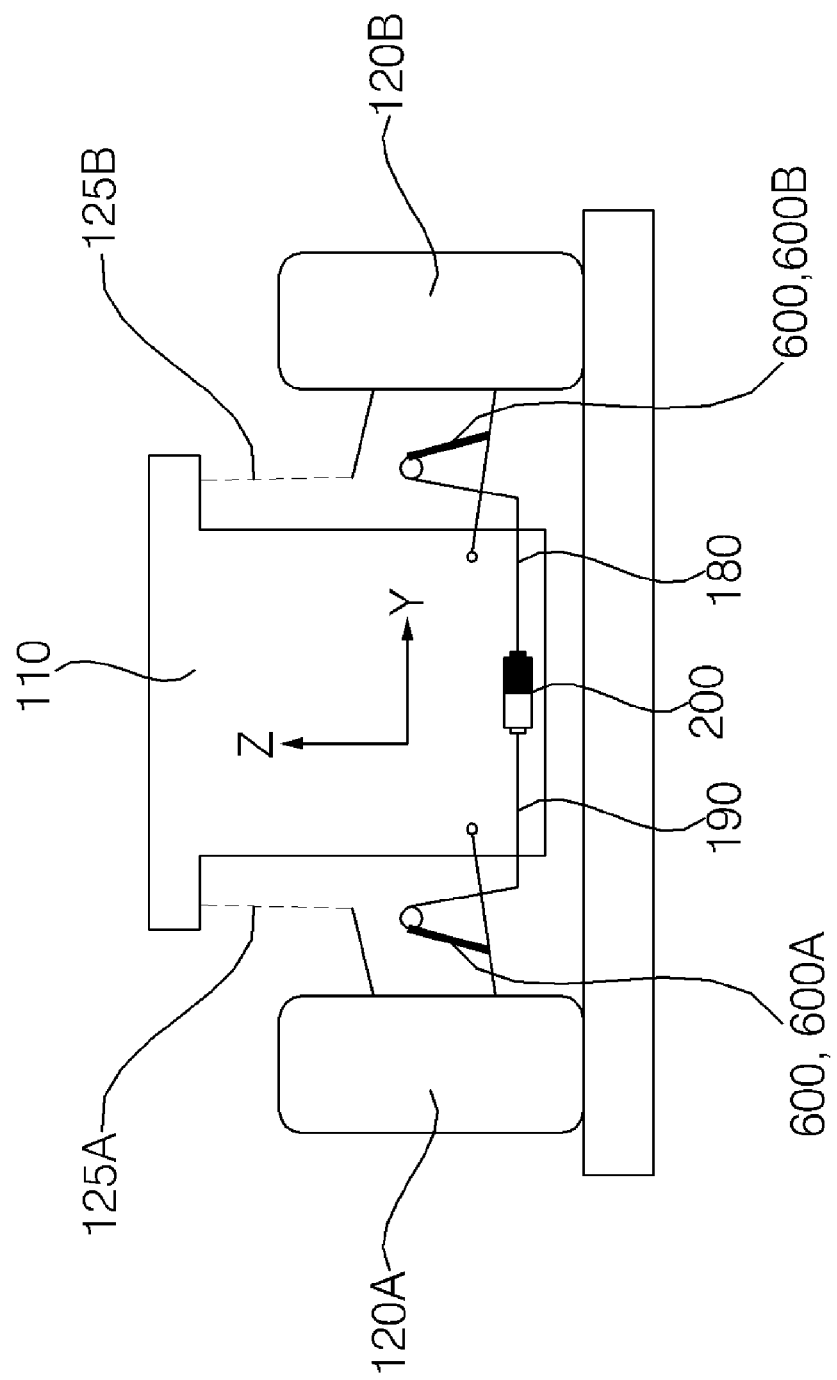
Figure 7B:
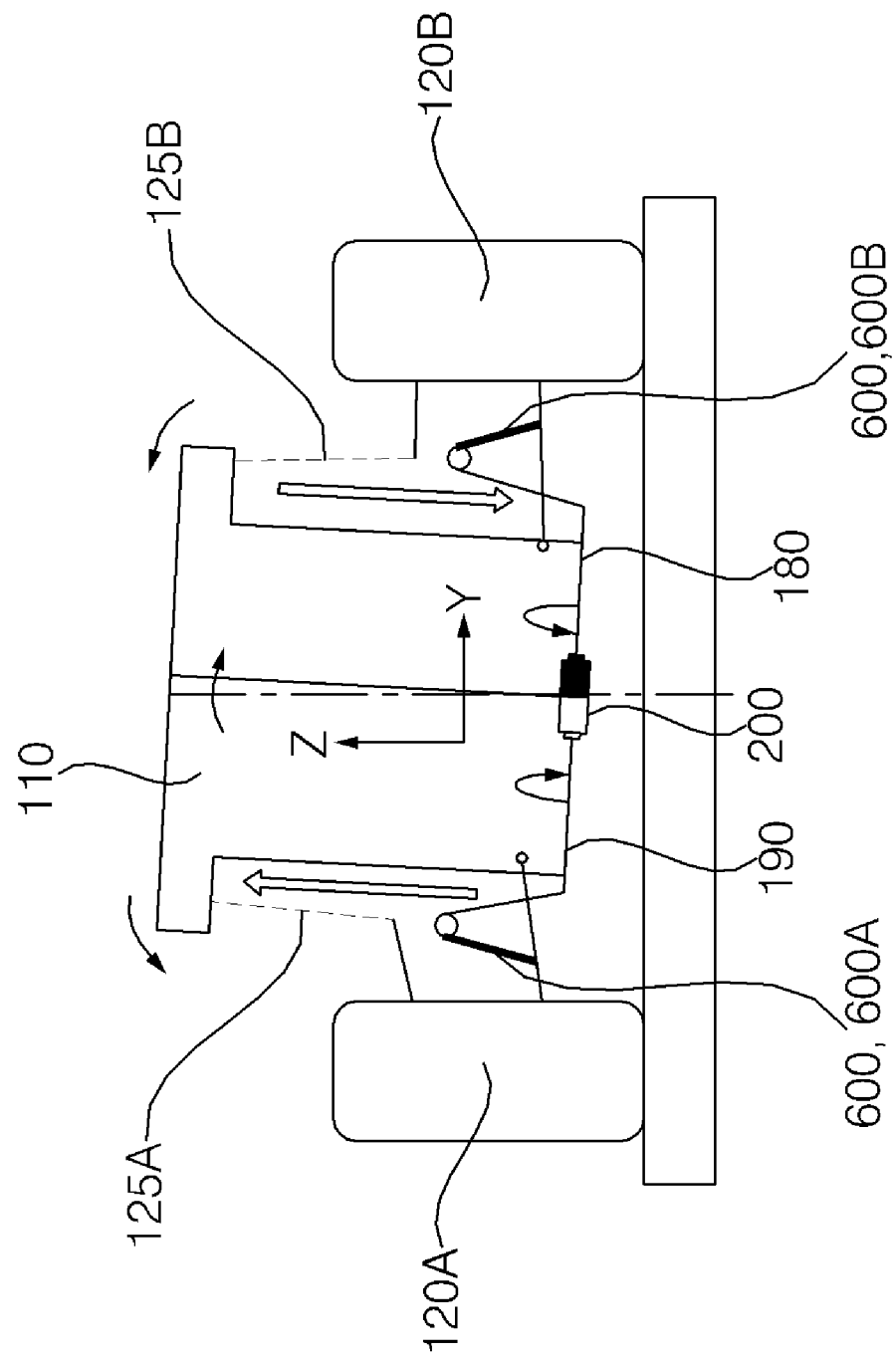

FIG. 6 is a front view of a vehicle body for explaining an operation of an active rotary stabilizer for a vehicle, and FIGS. 7A to 7C are conceptual views illustrating a process of operating the active rotary stabilizer for a vehicle.

As illustrated in FIG. 6, an exemplary embodiment of an active rotary stabilizer for a vehicle according to the present invention may include a fixed stabilizer bar 180 and a rotary stabilizer bar 190 which extend in a lateral direction toward a front right wheel 120A and a front left wheel 120B of a vehicle body 110, respectively, and an actuator 100 which is disposed between the fixed stabilizer bar 180 and the rotary stabilizer bar 190, connects adjacent end portions of the fixed stabilizer bar 180 and the rotary stabilizer bar 190, and generates and supplies predetermined rotational force to the stabilizer bars 180 and 190.

One side of each of the fixed stabilizer bar 180 and the rotary stabilizer bar 190, which is connected with the actuator 100, extends straight in a longitudinal direction, and the other side thereof is bent at a predetermined angle so as to be rotatable by an operation of the actuator 100. The bent side of each of the fixed stabilizer bar 180 and the rotary stabilizer bar 190 may be connected to a lower arm of the vehicle body 110 by means of a stabilizer bar link (hereinafter, referred to as "stepped bar link") 600.

An operation of the active rotary stabilizer for a vehicle, which has the aforementioned configurations, will be briefly described below.

First, as illustrated in FIG. 7A, when the vehicle travels straight, the actuator 100 of the active rotary stabilizer for a vehicle is never operated.

Next, as illustrated in FIG. 7B, when the vehicle turns right, the vehicle body 110 tilts leftward due to inertia. In this case, the actuator 100 is operated to generate rotational force in one direction so as to restore the vehicle body 110 to the original position. Then, the fixed stabilizer bar 180, which is disposed at a side of the vehicle body 110 that becomes relatively lowered, is rotated in one direction, and pushes the lower arm 130B by means of the stepped bar link 600 (600B) to raise the vehicle body 110, and the rotary stabilizer bar 190, which is disposed at a side of the vehicle body 110 that becomes relatively raised, is rotated in the other direction, and pulls the lower arm 130A by means of the stepped bar link 600 (600A) to lower the vehicle body 110 so that the vehicle body 110 is restored to the original position.

On the contrary, as illustrated in FIG. 7C, when the vehicle turns left, the vehicle body 110 tilts rightward due to inertia. In this case, the actuator 100 is operated to generate rotational force in the other direction so as to restore the vehicle body 110 to the original position. Then, the fixed stabilizer bar 180, which is disposed at a side of the vehicle body 110 that is relatively raised, is rotated in the other direction, and pulls the lower arm 130B by means of the stepped bar link 600B to lower the vehicle body 110, and the rotary stabilizer bar 190, which is disposed at a side of the vehicle body 110 that is relatively lowered, is rotated in one direction, and pushes the lower arm 130A by means of the stepped bar link 600A to raise the vehicle body 110 so that the vehicle body 110 is restored to the original position.

As described, the posture of the vehicle body 110, which tilts in one direction or the other direction depending on a traveling state of the vehicle, is adjusted to be a posture when the vehicle travels straight instead of a posture when the vehicle turns, thereby providing occupants with a more comfortable and stable traveling environment.

Figure 8:
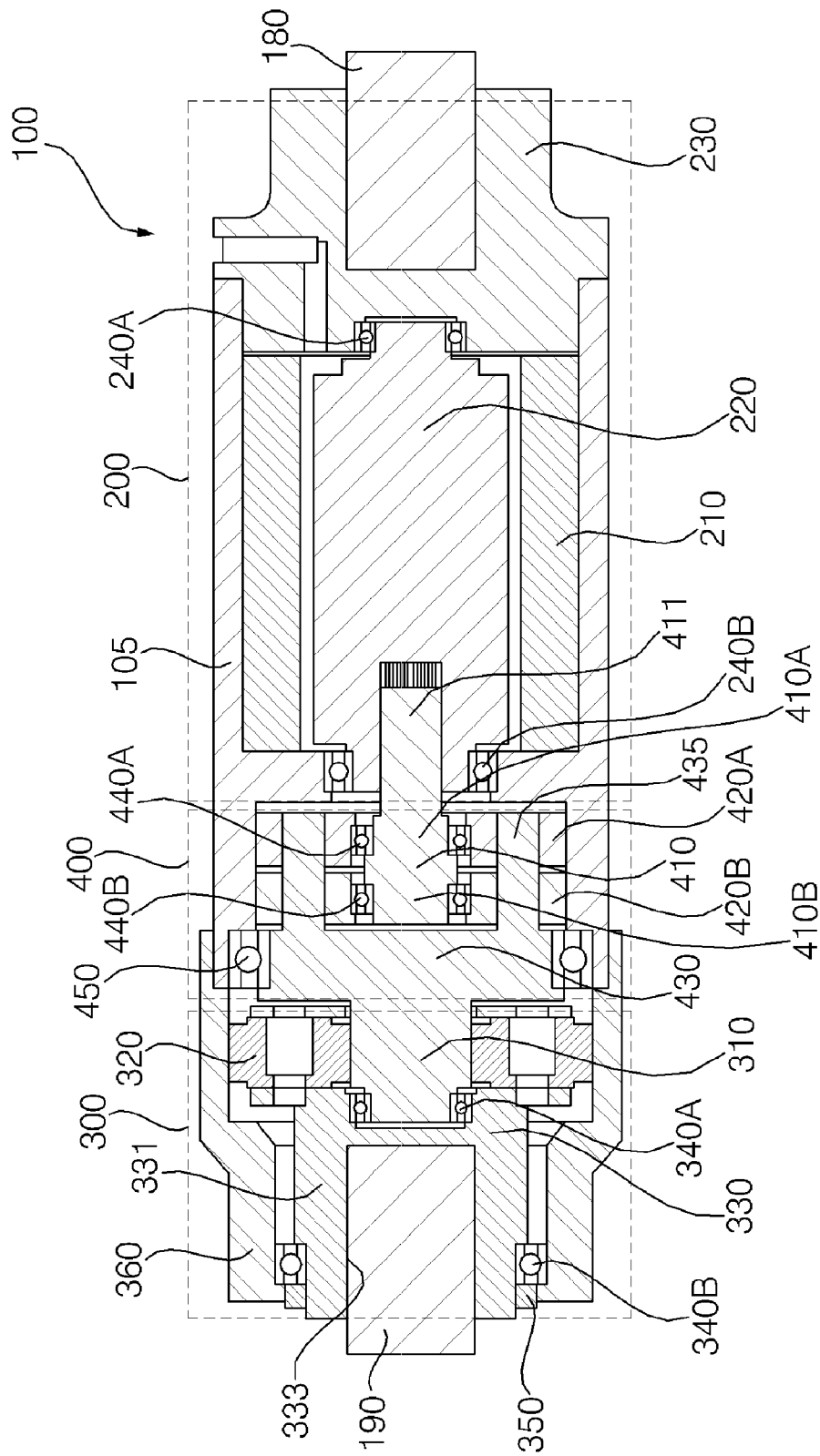
FIG. 8 is a cross-sectional view illustrating a first exemplary embodiment of an active rotary stabilizer for a vehicle according to the present invention.
Figure 9:
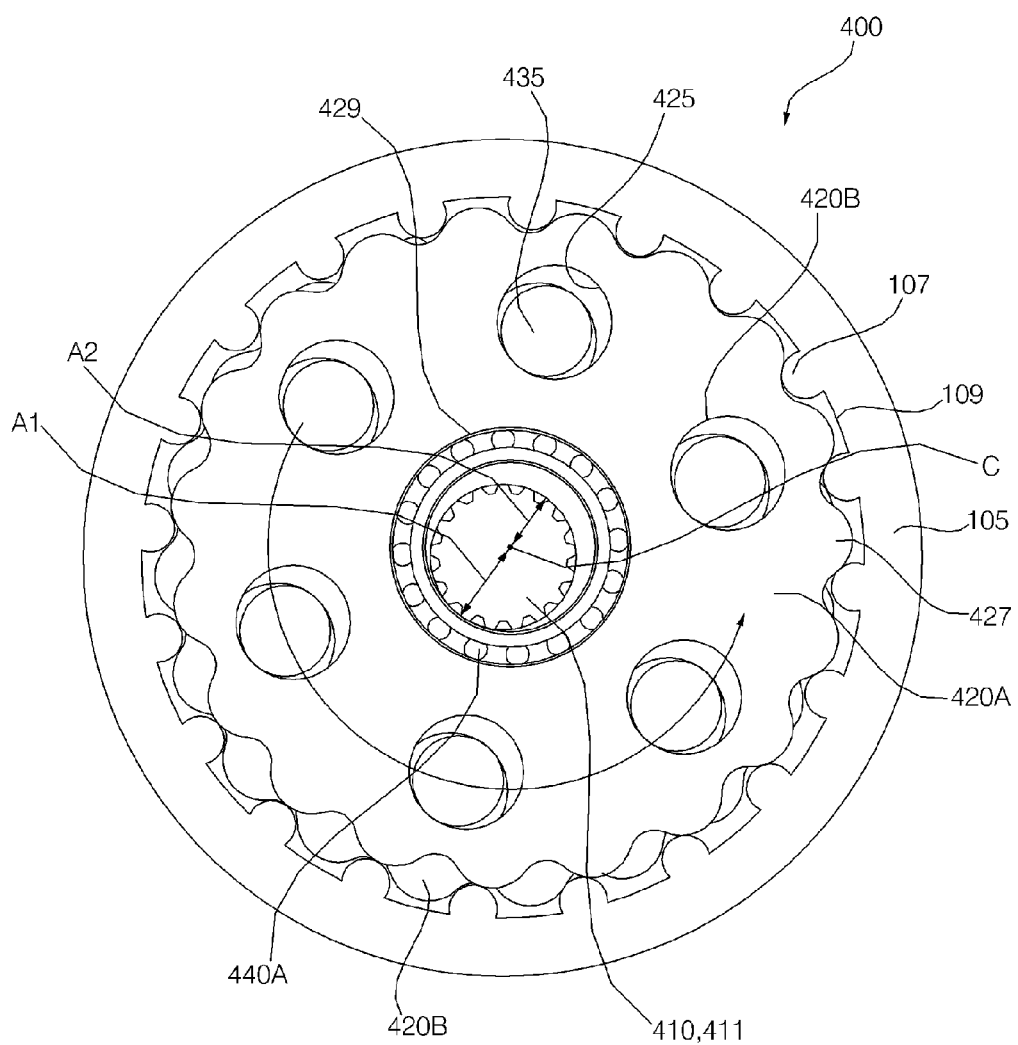
FIG. 9 is a cross-sectional view illustrating a state in which a cycloid reduction unit, which is a constituent element of the active rotary stabilizer for a vehicle according to the present invention, is operated.
Figure 10:
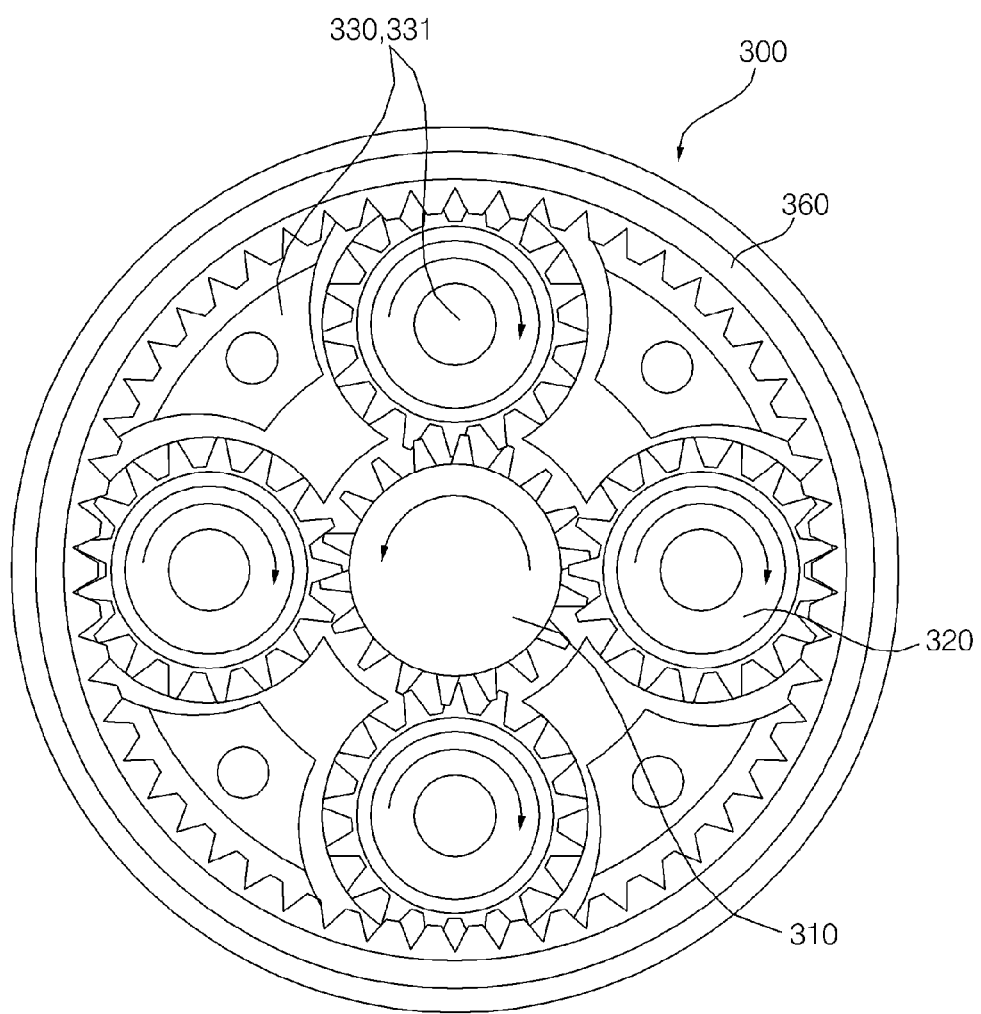
FIG. 10 is a cross-sectional view illustrating a state in which a planetary gear reduction unit, which is a constituent element of the active rotary stabilizer for a vehicle according to the present invention, is operated.
Figure 11:
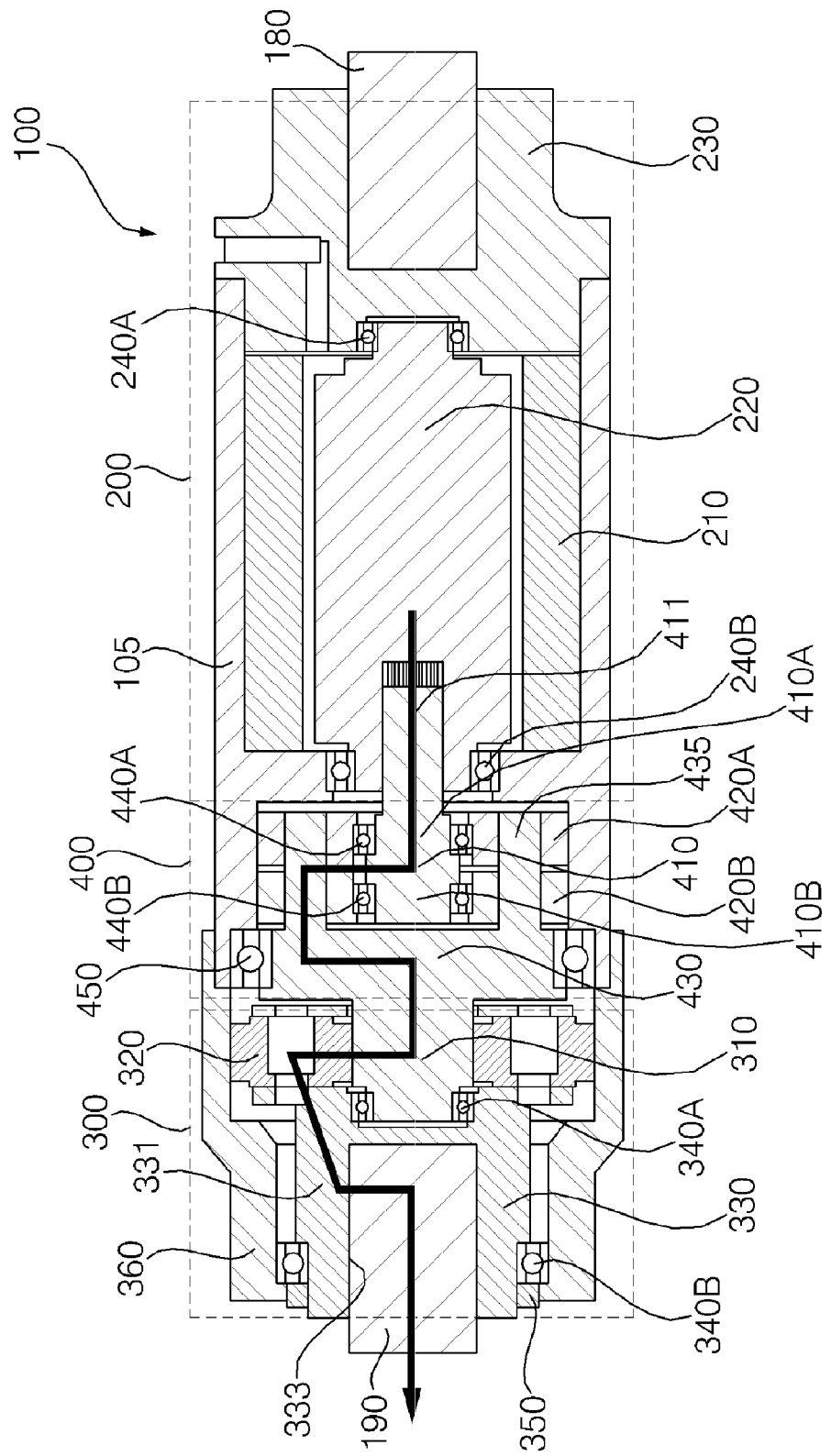
FIG. 11 is a cross-sectional view illustrating a state in which the active rotary stabilizer for a vehicle according to the present invention outputs force.
Figure 12:
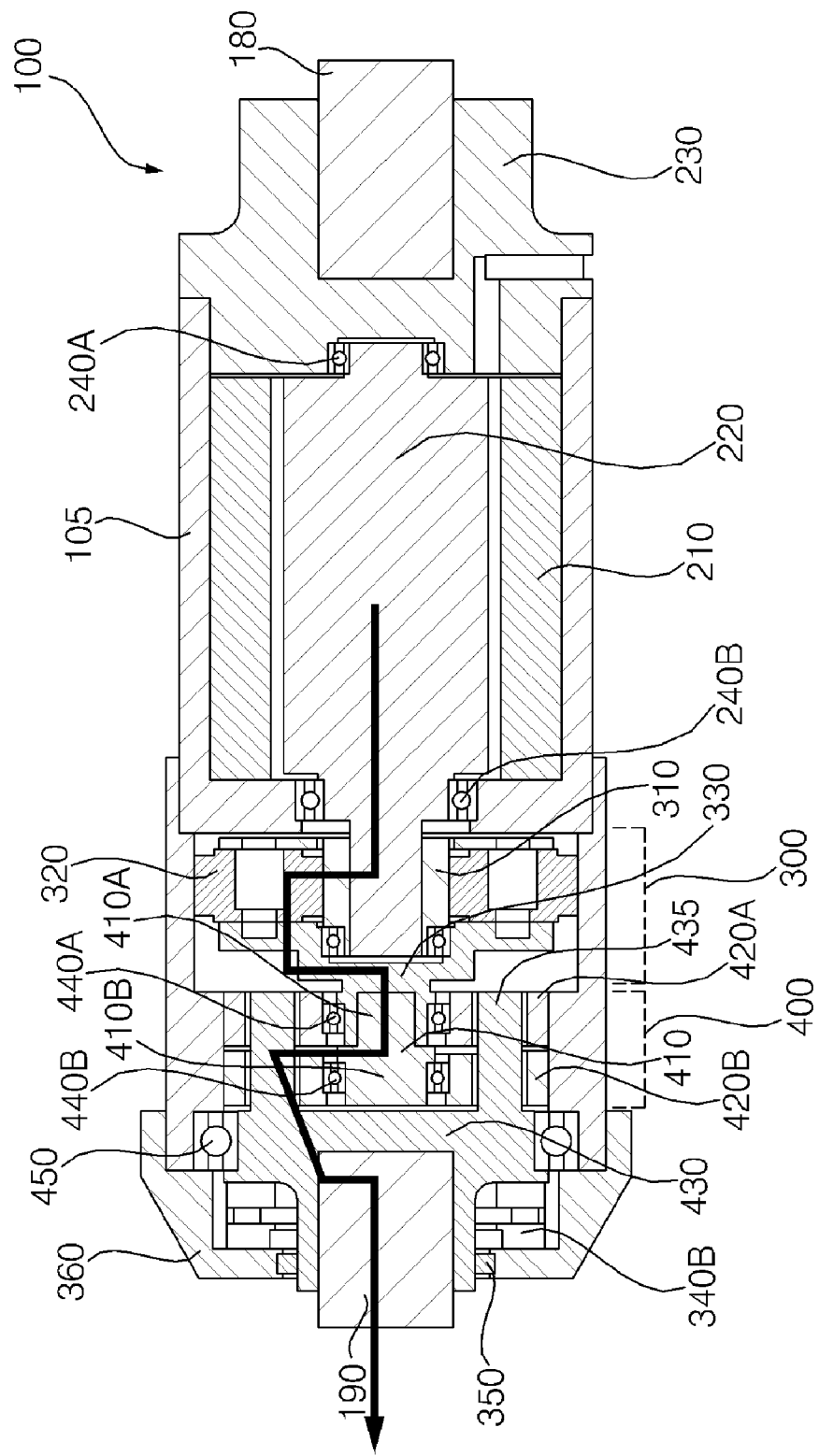
FIG. 12 is a cross-sectional view illustrating a configuration of a reduction unit according to a second exemplary embodiment of the active rotary stabilizer for a vehicle according to the present invention, and illustrating a state in which the reduction unit outputs force.

FIG. 8 is a cross-sectional view illustrating a first exemplary embodiment of an active rotary stabilizer for a vehicle according to the present invention, FIG. 9 is a cross-sectional view illustrating a state in which a cycloid reduction unit, which is a constituent element of the active rotary stabilizer for a vehicle according to the present invention, is operated, FIG. 10 is a cross-sectional view illustrating a state in which a planetary gear reduction unit, which is a constituent element of the active rotary stabilizer for a vehicle according to the present invention, is operated, FIG. 11 is a cross-sectional view illustrating a state in which the active rotary stabilizer for a vehicle according to the present invention outputs force, and FIG. 12 is a cross-sectional view illustrating a configuration of a reduction unit according to a second exemplary embodiment of the active rotary stabilizer for a vehicle according to the present invention, and illustrating a state in which the reduction unit outputs force.

An exemplary embodiment of an active rotary stabilizer 100 for a vehicle according to the present invention includes a housing 105 which has a predetermined space therein, a drive unit 200 which generates predetermined rotational force, and reduction units 300 and 400 which reduce the rotational force generated by the drive unit 200 so as to have a predetermined reduction ratio.

In more detail, as illustrated in FIGS. 8 and 11, the drive unit 200 may include a stator 210 which is fixed to be adjacent to an inner circumferential surface at one side inside the housing 105, and a rotor 220 which is rotated in the stator 210 by being supplied with electric power. That is, the drive unit 200 is a kind of drive motor that is operated by electric power. Positions of the stator 210 and the rotor 220 are not limited, and in some exemplary embodiments, the stator 210 may be positioned at an axial center of the housing 105, and the rotor 220 may be disposed to surround an outer circumferential surface of the stator 210 so as to be rotated by being supplied with electric power.

The reduction units 300 and 400 may include a first reduction unit 400 and a second reduction unit 300 which are disposed to be adjacent to the drive unit 200, are supplied with rotational force from the drive unit 200, and primarily and secondarily reduce the rotational force.

Hereinafter, for ease of description, the first reduction unit 400 is defined as a cycloid reduction unit using a cycloid gear, and the second reduction unit is defined as a planetary gear reduction unit using a planetary gear set. A case in which the first reduction unit, that is, the cycloid reduction unit 400 is disposed to be adjacent to the drive unit 200 is referred to as a reduction unit according to a first exemplary embodiment, and a case in which the second reduction unit, that is, the planetary gear reduction unit 300 is disposed to be adjacent to the drive unit 200 is referred to as a reduction unit according to a second exemplary embodiment.

Meanwhile, the exemplary embodiment of the active rotary stabilizer 100 for a vehicle according to the present invention may further include: a fixed stabilizer bar 180 which is welded on a drive unit cover 230, which is coupled to surround the drive unit 200 at one side of the housing 105 adjacent to the drive unit 200, rotates in conjunction with the housing 105, and provides predetermined torsional force to one side of the vehicle body 110 of the vehicle that turns; and a rotary stabilizer bar 190 which is coupled to an output end that protrudes toward the other side of the housing 105 adjacent to the planetary gear reduction unit 300 or the cycloid reduction unit 400, rotates relative to the housing 105, and provides predetermined torsional force to the other side of the vehicle body 110 of the vehicle that turns.

As illustrated in FIG. 8, according to the exemplary embodiment of the active rotary stabilizer 100 for a vehicle according to the present invention which adopts the reduction unit according to the first exemplary embodiment, the cycloid reduction unit 400 is provided in the housing 105 so as to be disposed to be adjacent to the drive unit 200, receives rotational force from the drive unit 200, and serves to primarily reduce the rotational force at a predetermined ratio, and the planetary gear reduction unit 300 is provided at the other side in the housing 105, receives the primarily reduced rotational force from an output shaft 430 of the cycloid reduction unit 400, and serves to secondarily reduce the rotational force at a predetermined ratio.

Here, as illustrated in FIGS. 8 and 9, the cycloid reduction unit 400 may include: an eccentric shaft 410 which has one end connected to the rotor 220, and a pair of eccentric bodies 410A and 410B that is provided at the other end of the eccentric shaft 410 and is eccentrically and axially connected to each other so as to be symmetrical at 180 degrees; a pair of cycloid discs 420A and 420B which has cycloid teeth 427 formed along outer circumferential surfaces of the cycloid discs 420A and 420B, a plurality of disc moving holes 425 penetratively formed in the axial direction along the same circumference, and fixing holes 429 that are penetratively formed at centers of the cycloid discs 420A and 420B in the axial direction so that the pair of eccentric bodies 410A and 410B of the eccentric shaft 410 is sequentially inserted into and rotatably supported by the fixing holes 429; an output shaft 430 which has a plurality of input legs 435 that is formed at one side of the output shaft 430 and inserted into the disc moving holes 425, and an output sun gear portion 310 that is formed at the other side of the output shaft 430, extends to a side where the planetary gear reduction unit 300 is provided, and is rotated at a reduced speed along with the rotation of the pair of cycloid discs 420A and 420B; and an internal teeth portion 107 which has internal teeth that are formed on an inner surface of the housing 105 and engaged with the cycloid teeth 427 of the pair of cycloid discs 420A and 420B.

Both end portions of the rotor 220 may be rotatably supported by rotor bearings 240A and 240B interposed between inner surfaces of the housing 105.

One end of the eccentric shaft 410 is inserted into the rotor 220 and coupled to the rotor 220 in a spline gear connection manner, and the pair of eccentric bodies 410A and 410B, which has outer circumferential surfaces that are eccentric with respect to a rotation center, is formed at the other end of the eccentric shaft 410, as described above.

The pair of eccentric bodies 410A and 410B formed on the eccentric shaft 410 is disposed to be adjacent to each other and to be approximately connected to each other in the axial direction of the eccentric shaft 410, and inserted into the fixing holes 429 formed at the centers of the pair of cycloid discs 420A and 420B, such that when the eccentric shaft 410 is rotated by rotational force supplied from the rotor 220, the pair of cycloid discs 420A and 420B, which is rotatably supported by the pair of eccentric bodies 410A and 410B that has the outer circumferential surfaces that are eccentric with respect to the rotation center, swings while performing rolling friction motion with respect to the outer circumferential surfaces of the pair of eccentric bodies 410A and 410B.

Here, the internal teeth of the internal teeth portion 107 do not normally mesh with all of the cycloid teeth 427 formed on the outer circumferential surfaces of the pair of cycloid discs 420A and 420B, but are spaced apart from the cycloid teeth 427 at predetermined intervals. Since the number of cycloid teeth 427 formed on the pair of cycloid discs 420A and 420B is one less than the number of internal teeth of the internal teeth portion 107, when the pair of cycloid discs 420A and 420B swings while performing rolling friction motion with respect to the outer circumferential surfaces of the pair of eccentric bodies 410A and 410B, only one of the cycloid teeth 427 meshes with one of the plurality of internal teeth, and the remaining cycloid teeth 427 do not normally mesh with the remaining internal teeth, and each time the eccentric shaft 410 makes one rotation, the cycloid tooth 427, which has normally meshed with the internal tooth, normally meshes with another internal tooth next to the internal tooth that has normally meshed with the cycloid tooth 427. Roller bearings 440A and 440B may be interposed between the eccentric shaft 410 and the fixing holes 429 of the pair of cycloid discs 420A and 420B so that the pair of cycloid discs 420A and 420B may perform the rolling friction motion as described above.

Meanwhile, the plurality of input legs 435 formed on the output shaft 430 is inserted into the disc moving holes 425, respectively, such that the output shaft 430 is rotated by receiving simultaneous rotational force from the pair of cycloid discs 420A and 420B, thereby obtaining a reduction ratio at which the output shaft 430 makes one rotation when the eccentric shaft 410 is rotated corresponding to the number of internal teeth.

The output shaft 430 may be rotatably supported by an output shaft bearing 450 interposed between the inner surfaces of the housing 105.

In the cycloid reduction unit 400 having the aforementioned configurations and operational relationships, the number of pair of eccentric bodies 410A and 410B formed on the eccentric shaft 410 and the number of cycloid discs 420A and 420B corresponding to the number of eccentric bodies 410A and 410B may be designed in sufficient consideration of a value of input force input to an input side. However, as will be described below, because a sum of thicknesses of the entire cycloid discs 420A and 420B is less than a thickness of a planet gear 320, it is possible to obtain a reduction ratio higher than that of a reduction mechanism in which planetary gear sets of the plurality of planetary gear reduction units 300 are continuously disposed, and it is possible to significantly reduce an overall length of the product.

Meanwhile, as illustrated in FIGS. 8 and 10, the planetary gear reduction unit 300 may include: a sun gear 310 (that has the same configuration and the same reference numeral as the output sun gear portion 310 of the output shaft 430 although the terms are different) which protrudes from a center at the other end of the output shaft 430 of the cycloid reduction unit 400 toward the other side in the housing 105 at a predetermined length, is rotated integrally with the output shaft 430, and has gear teeth formed on an outer circumferential surface thereof; a plurality of planet gears 320 which has gear teeth that mesh with the gear teeth of the sun gear 310, is disposed along an outer circumference of the sun gear 310, and revolves around the sun gear 310 in accordance with the rotation of the sun gear 310; a carrier unit 330 which simultaneously receives rotational force from the plurality of planet gears 320, and obtains a reduction ratio at which the carrier unit 330 is rotated at the revolution speed of the plurality of planet gears 320; and a planetary gear housing 360 which is disposed to surround the sun gear 310, the planet gears 320, and the carrier unit 330.

A tip portion of the sun gear 310 protrudes by a length so as to overlap a part of a central portion of the carrier unit 330, and a sun gear bearing 340A is interposed between the tip portion of the sun gear 310 and the carrier unit 330 to enable relative rotation.

Meanwhile, although not illustrated in the drawings, gear teeth, which mesh with the plurality of planet gears 320 while the plurality of planet gears 320 revolves, may be formed on an inner surface of the planetary gear housing 360 where the planet gears 320 are disposed.

Coupling legs (not illustrated), which protrude from centers of the planet gears 320 toward the carrier unit 330 in the axial direction, are formed on the planet gears 320, respectively, and the coupling legs are inserted into the carrier unit 330, such that the carrier unit 330 is rotated by the revolution of the plurality of planet gears 320.

A carrier output end 331, which has an insertion hole 333 into which a tip portion of the aforementioned rotary stabilizer bar 190 is inserted, is provided at the other side of the carrier unit 330, and as the carrier unit 330 is rotated while obtaining a predetermined reduction ratio, the rotary stabilizer bar 190 provides predetermined torsional force to the vehicle body 110 by being supplied with rotational force.

A carrier bearing 340B, which supports rotation of the carrier unit 330, may be interposed between the carrier unit 330 and the planetary gear housing 360.

The planetary gear reduction unit 300, which is configured as described above, is inferior in reduction ratio to the aforementioned cycloid reduction unit 400, and more planetary gear reduction mechanisms need to be continuously disposed in multiple stages in order to implement a reduction ratio equal to the reduction ratio of the cycloid reduction unit 400, and as a result, an overall length of the housing 105 needs to be further increased.

The exemplary embodiment of the active rotary stabilizer 100 for a vehicle according to the present invention has advantages in that an overall length of the housing 105, which defines an external appearance of the product, is reduced, whereby it is possible to improve a degree of freedom when designing a lower structure of the vehicle body 110 which is complicated due to installation of peripheral components.

That is, the exemplary embodiment of the active rotary stabilizer 100 for a vehicle according to the present invention is characterized in that at least one of the planetary gear reduction mechanisms in the related art, which are continuously disposed in at least two stages in order to obtain a reasonable reduction ratio, is replaced by the cycloid reduction unit 400 that obtains an excellent reduction ratio, thereby reducing an overall length of the housing 105.

In particular, overall lengths of the planet gears 320 and the carrier unit 330 of one set of planetary gear reduction mechanism occupy a relatively longer overall length than a reduction ratio that may be obtained by the cycloid reduction unit 400, and as a result, in the present invention, it is possible to implement an appropriate arrangement design in consideration of the reduction ratios obtained by the cycloid reduction unit 400 and the planetary gear reduction unit 300.

Meanwhile, the exemplary embodiment of the active rotary stabilizer 100 for a vehicle according to the present invention is not implemented only by the reduction unit according to the first exemplary embodiment, and may also be implemented by the reduction unit according to the second exemplary embodiment that is an exemplary embodiment in which the planetary gear reduction mechanism is disposed to be adjacent to the drive unit 200 as described above.

As illustrated in FIG. 12, the reduction unit according to the second exemplary embodiment includes: a housing 105 which has a predetermined space therein; a drive unit 200 which includes a stator 210 that is fixed to be adjacent to an inner circumferential surface at one side in the housing 105, and a rotor 220 that is rotated in the stator 210 by being supplied with electric power; a planetary gear reduction unit 300 which is provided in the housing 105, is disposed to be adjacent to the drive unit 200, receives rotational force from the drive unit 200, and primarily reduces the rotational force at a predetermined ratio; and a cycloid reduction unit 400 which is provided at the other side in the housing 105, receives the primarily reduced rotational force from an output shaft of the planetary gear reduction unit 300, and secondarily reduces the rotational force at a predetermined ratio.

Here, unlike the reduction unit according to the first exemplary embodiment, in the reduction unit according to the second exemplary embodiment, the planetary gear reduction unit 300, that is, a planetary gear reduction mechanism primarily receives rotational force provided directly from the drive unit 200. However, the reduction unit according to the second exemplary embodiment also has a structure in which the rotational force, which has been primarily reduced by the planetary gear reduction unit 300, is secondarily reduced by the cycloid reduction unit 400, and as a result, the second exemplary embodiment has the same technical feature as the first exemplary embodiment.

Meanwhile, an actuator 100, which is a constituent element of the active rotary stabilizer 100 for a vehicle according to the present invention, will be described below in more detail.

The actuator 100 may include: a housing 105 which has a predetermined space therein; a drive unit 200 which is disposed at one side in the housing 105 and generates predetermined rotational force; a reduction unit 200 which is disposed at the other side in the housing 105 and reduces rotational force transmitted from the drive unit 200.

The housing 105 is provided so that one side and the other side thereof are opened, the drive unit 200 may be provided at one side in the predetermined space formed in the housing 105, and a planetary gear reduction unit 300 may be provided at the other side in the predetermined space opposite to the one side.

As illustrated in FIGS. 8 and 10, the drive unit 200 may include a motor including a stator 210 which is fixed to an inner circumferential surface of the housing 105, and a rotor 220 which is disposed inside the stator 210 and rotated when electric power is applied to the rotor 220. The opened one side of the housing 105 may be shielded by a drive unit cover 230 that supports a motor shaft, which is a part of the rotor 220 that is a constituent element of the motor, and prevents foreign substances from entering the housing 105.

The planetary gear reduction unit 300 may include: a sun gear 310 which is rotated coaxially with the rotor 220 by rotational force provided by the rotor 220 that is a constituent element of the motor; a plurality of planet gears 320 which meshes with an outer circumference of the sun gear 310 and revolves around the sun gear 310; and a planetary gear housing 360 which accommodates the sun gear 310 and the plurality of planet gears 320 and rotates in one direction by meshing with the plurality of planet gears 320 that revolves around the sun gear 310.

A fixed stabilizer bar 180 is coupled, by welding, to an outer portion of the housing 105 at a side where the drive unit 200 is provided, and serves to receive relative rotational force between the drive unit 200 and the planetary gear reduction unit 300 and transmit predetermined torsional force to one side of a vehicle body 110.

In addition, a rotary stabilizer bar 190 is inserted from the outside into the inside of the housing 105 at a side where the planetary gear reduction unit 300 is provided, and serves to receive relative rotational force between the drive unit 200 and the planetary gear reduction unit 300 and transmit predetermined torsional force to the other side of the vehicle body 110.

In more detail, one end of the fixed stabilizer bar 180 is completely fixedly coupled, by welding, to an outer portion of the drive unit cover 230 that supports the motor shaft while shielding the one side of the housing 105, and the other end of the fixed stabilizer bar 180 is coupled to a portion of the vehicle body 110 that is adjacent to a wheel 120B (see FIG. 16) positioned in a direction in which the other end extends, particularly, by means of one stabilizer bar link 600B (see FIG. 16) connected to a suspension system.

One end of the rotary stabilizer bar 190 is coupled to a carrier output end 331 which is formed outward from the planetary gear housing 360, and the other end of the rotary stabilizer bar 190 is coupled to a portion of the vehicle body 110 that is adjacent to a wheel 120A (see FIG. 16) positioned in a direction in which the other end extends like the fixed stabilizer bar 180, particularly, by means of the other stabilizer bar link 600A (see FIG. 16) connected to the suspension system.

The fixed stabilizer bar 180 is completely fixedly coupled to the outer portion of the housing 105 so as to be rotated integrally with the housing 105 in conjunction with the housing 105, and the rotary stabilizer bar 190 is coupled to be rotatable relative to the housing 105.

In particular, since the fixed stabilizer bar 180 is integrally coupled to the drive unit cover 230 by welding, there is no major problem in transmitting rotational force provided by the drive unit 200. However, since the rotary stabilizer bar 190 has a structure in which relative rotational force with high torque is transmitted in the axial direction by means of the planetary gear reduction unit 300, the rotary stabilizer bar 190 adopts a spline gear connection by which force is easily transmitted in the axial direction.

Figure 13:
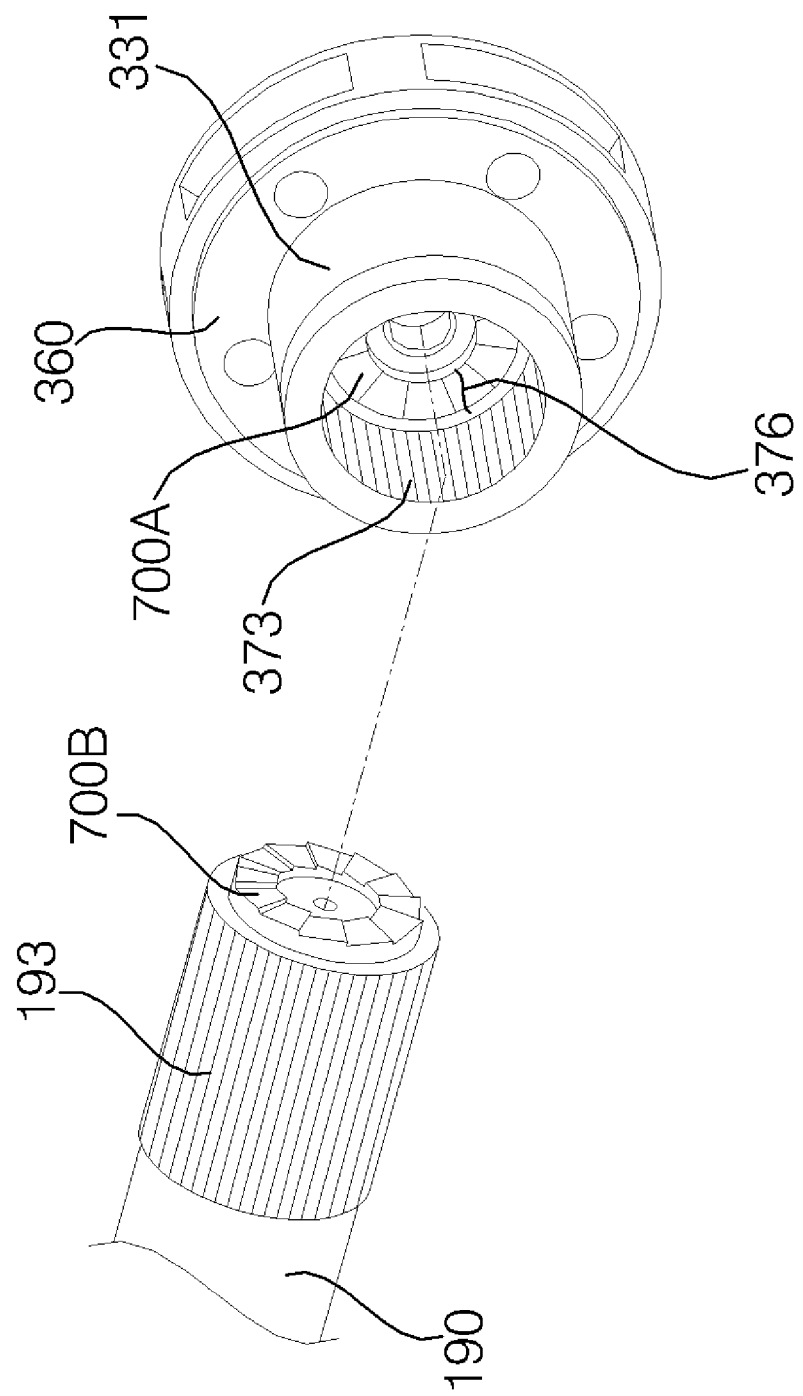
FIG. 13 is an exploded view illustrating a coupling relationship according to the first exemplary embodiment between a planetary gear housing and a rotary stabilizer bar that are constituent elements in FIG. 6.

In the exemplary embodiment of the active rotary stabilizer for a vehicle according to the present invention, as illustrated in FIG. 13, an insertion hole 376 is formed in the carrier output end 331 of the planetary gear housing 360 so that a tip portion of the rotary stabilizer bar 190 is inserted into the insertion hole 376, and female spline gear teeth 373 are formed on an inner circumferential surface of the insertion hole 376. Further, male spline gear teeth 193 are formed on the tip portion of the rotary stabilizer bar 190 which is inserted into the insertion hole 376, and the female spline gear teeth 373 and the male spline gear teeth 193 mesh with each other.

In particular, a backlash reducing unit 700, which reduces a backlash caused by rotation due to the spline gear connection between the rotary stabilizer bar 190 and the carrier output end 331 of the planetary gear housing 360, may be provided between the rotary stabilizer bar 190 and the planetary gear housing 360 that is a constituent element of the planetary gear reduction unit 300.

The backlash reducing unit 700 serves to reduce noise caused by the backlash due to clearance in a rotational direction between the rotary stabilizer bar 190 and the carrier output end 331 of the planetary gear housing 360 when the rotary stabilizer bar 190 and the carrier output end 331 of the planetary gear housing 360 are connected with each other by the spline gear connection in a case in which a thickness of the male spline gear tooth 193 is smaller than a thickness of the female spline gear tooth 373.

The backlash reducing unit 700 may include a first serrated portion 700A which is formed on a bottom surface in the insertion hole 376 of the carrier output end 331 of the planetary gear housing 360, and a second serrated portion 700B which is formed on a tip surface of the rotary stabilizer bar 190.

The first serrated portion 700A and the second serrated portion 700B are formed at positions corresponding to each other so that the first serrated portion 700A and the second serrated portion 700B mesh with each other. The first serrated portion 700A and the second serrated portion 700B may be formed in a ring shape along a rim of the circular bottom surface in the insertion hole 376 and a rim of the circular tip surface of the rotary stabilizer bar 190, respectively.

Figure 14A:
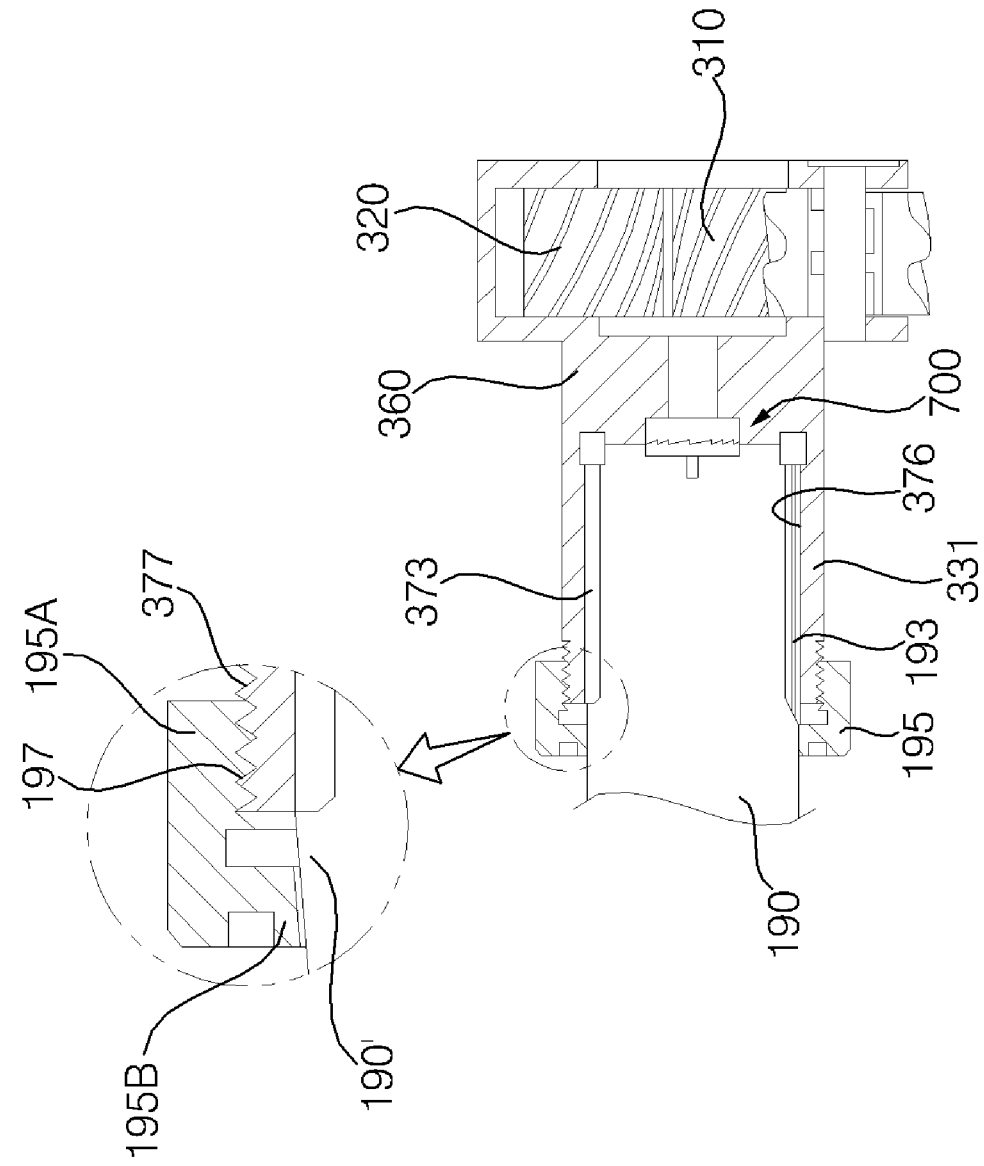
FIGS. 14A and 14B each are a cross-sectional view and a partially enlarged view illustrating an operational process of FIG. 6.
Figure 14B:
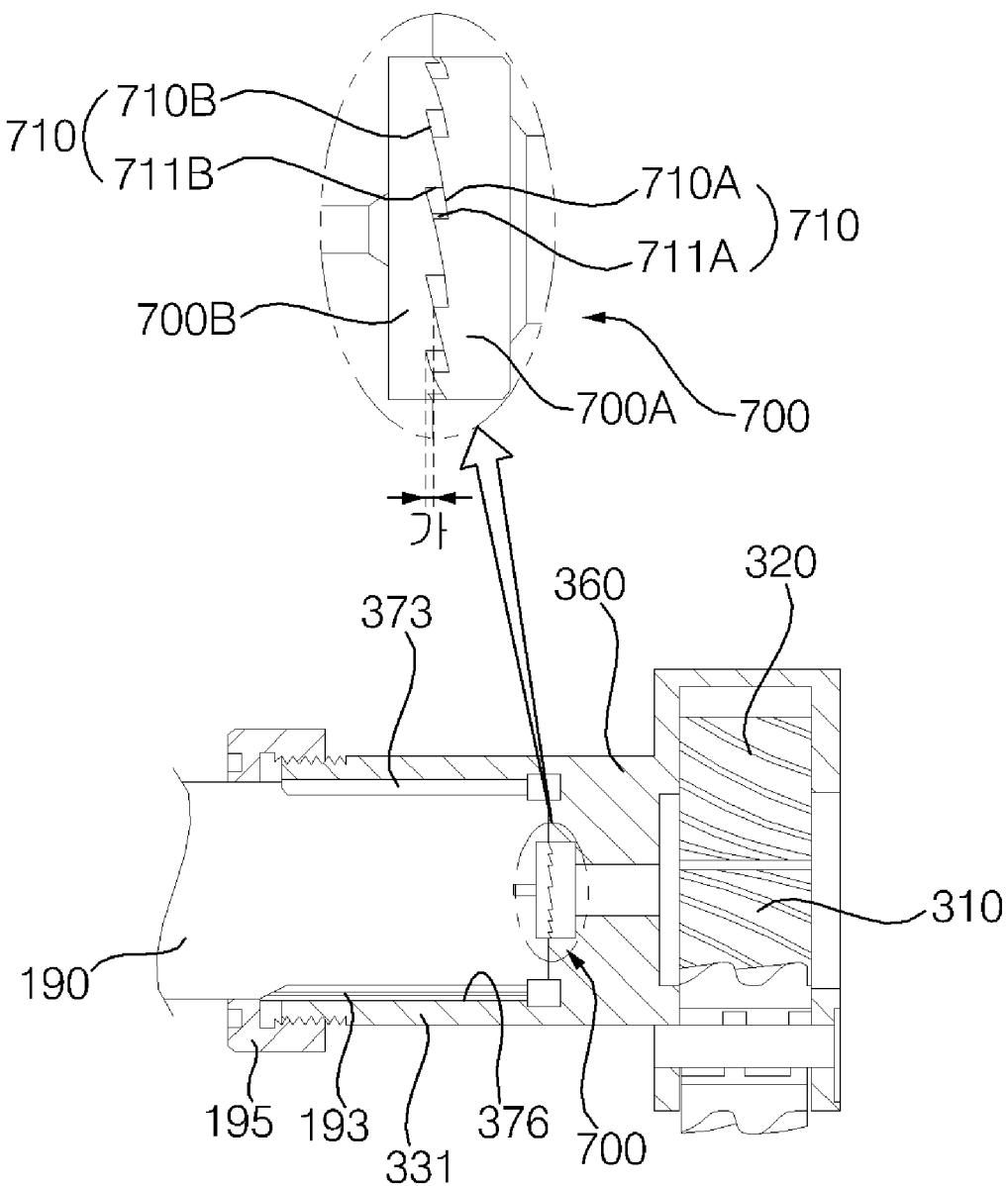

FIGS. 14A and 14B each are a cross-sectional view and a partially enlarged view illustrating an operational process of FIG. 6.

As illustrated in FIGS. 14A and 14B, the first serrated portion 700A and the second serrated portion 700B have a plurality of inclined surfaces 710A and 710B which is in surface-to-surface contact with each other so that the first serrated portion 700A and the second serrated portion 700B may become spaced apart from each other in the axial direction of the rotary stabilizer bar 190 when the planetary gear housing 360 having the carrier output end 331 is rotated in one direction. A plurality of vertical surfaces 711A and 711B is formed between the plurality of inclined surfaces 710A and 710B so that the first serrated portion 700A and the second serrated portion 700B are not spaced apart from each other when the rotary stabilizer bar 190 is rotated in the other direction instead of the one direction.

A coupling nut 195, which is used to fix the rotary stabilizer bar 190, may be coupled to an outer portion of the carrier output end 331 of the planetary gear housing 360.

In more detail, referring to an enlarged view in FIG. 14A, the coupling nut 195 may include a fastening portion 195A which has an internal threaded portion 197 that is formed on an inner circumferential surface of the fastening portion 195A, and fastened to an external threaded portion 377 formed on the outer portion of the carrier output end 331, and a support portion 195B which extends from one side of the fastening portion 195A and exerts coupling force while securely supporting an outer circumferential surface of the rotary stabilizer bar 190.

The support portion 195B serves to provide a larger amount of coupling force between the carrier output end 331 and the outer circumferential surface of the rotary stabilizer bar 190 when the rotary stabilizer bar 190 is moved from the outer portion of the carrier output end 331.

To this end, an outer diameter of an outer circumferential surface 190' of the rotary stabilizer bar 190, which is positioned outside the insertion hole 376 and adjacent to the carrier output end 331, may be gradually increased as the distance from the carrier output end 331 is decreased, and a support end 195B, which is in contact with the outer circumferential surface 190' of the rotary stabilizer bar 190, may be formed to be inclined so as to be in more tight contact with the outer circumferential surface 190' that is gradually increased in outer diameter.

The planetary gear housing 360 may be configured to be rotated in a direction in which the first serrated portion 700A and the second serrated portion 700B, which are constituent elements of the backlash reducing unit 700, are spaced apart from each other when rotational force provided by the drive unit 200 is supplied to the rotary stabilizer bar 190.

Figure 15:
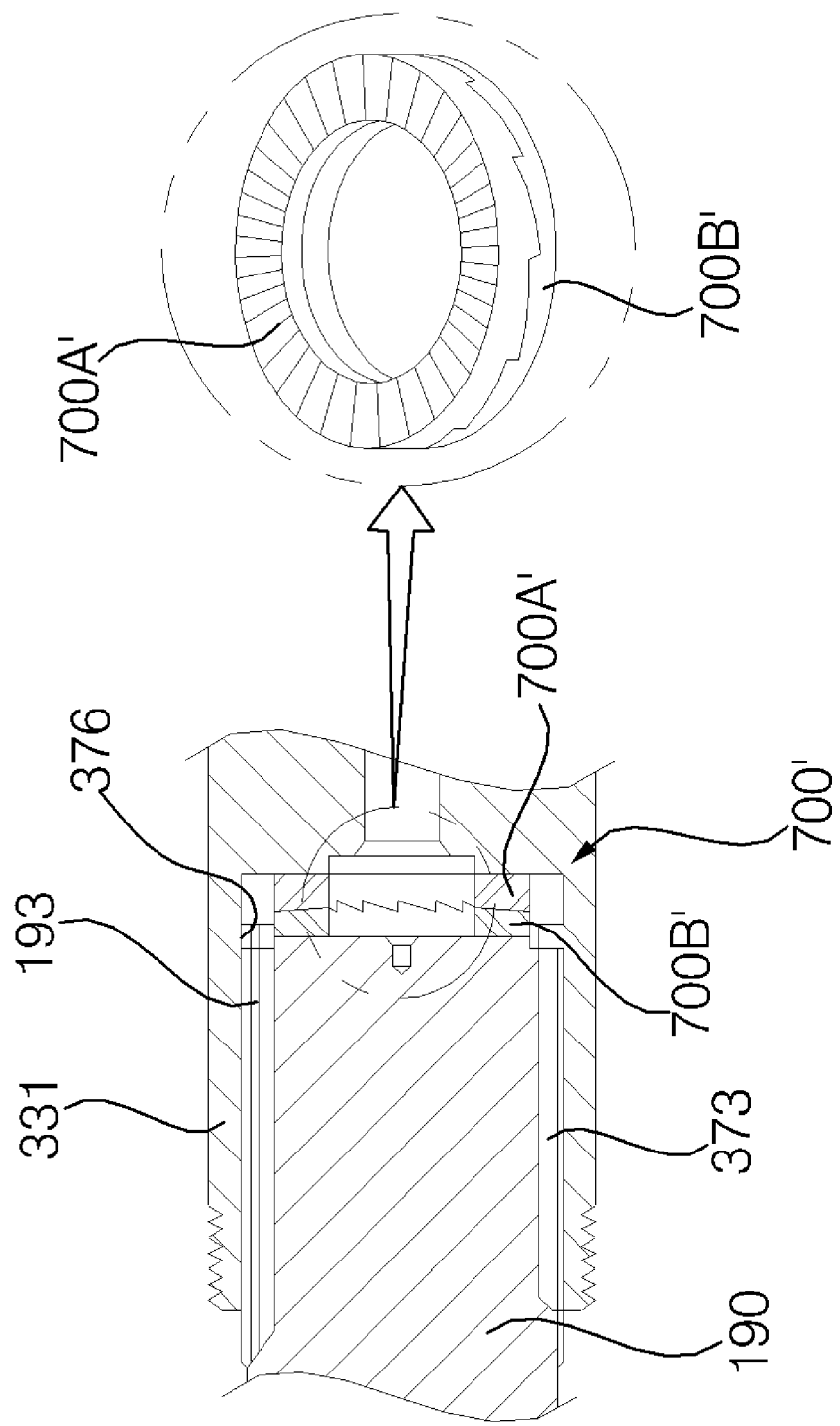
FIG. 15 is a cross-sectional view illustrating a coupling relationship according to the second exemplary embodiment between the planetary gear housing and the rotary stabilizer bar that are constituent elements in FIG. 6.

FIG. 15 is a cross-sectional view illustrating a coupling relationship according to the second exemplary embodiment between the planetary gear housing and the rotary stabilizer bar that are constituent elements in FIG. 6.

However, in the exemplary embodiment of the active rotary stabilizer for a vehicle according to the present invention, the backlash reducing unit 700 is not limited to the aforementioned exemplary embodiment (hereinafter, for ease of description, the exemplary embodiment of the backlash reducing unit 700 is referred to as a "first exemplary embodiment", and an exemplary embodiment of a backlash reducing unit 700', which will be described below, is referred to as a "second exemplary embodiment"). That is, the backlash reducing unit 700 according to the first exemplary embodiment includes the first serrated portion 700A and the second serrated portion 700B that are integrally formed on the tip portion of the rotary stabilizer bar 190 and the bottom surface in the insertion hole 376 of the carrier output end 331, respectively, but the backlash reducing unit 700 having the first serrated portion 700A and the second serrated portion 700B need not be necessarily configured integrally with peripheral configurations.

As illustrated in FIG. 15, unlike the backlash reducing unit 700 according to the first exemplary embodiment, the backlash reducing unit 700' according to the second exemplary embodiment may have a first serrated portion 700A' and a second serrated portion 700B' that are manufactured separately from peripheral configurations and interposed between the tip portion of the rotary stabilizer bar 190 and the bottom surface in the insertion hole 376 of the carrier output end 331.

According to the backlash reducing unit 700' according to the second exemplary embodiment, in a case in which inclined surfaces 710A and 710B and vertical surfaces 711A and 711B are damaged because the backlash reducing unit 700' has been used over a long period of time, only the first serrated portion 700A' and the second serrated portion 700B', which are damaged, may be replaced without inconvenience of having to replace the rotary stabilizer bar 190 or the planetary gear housing 360 as a whole. Furthermore, the first serrated portion 700A and the second serrated portion 700B, which have the inclined surfaces 710A and 710B having different inclination angles, may be used depending on a degree of abrasion of female and male spline gear teeth 373 and 193 formed on the rotary stabilizer bar 190 and the insertion hole 376 that generate the backlash, thereby actively coping with the occurrence of noise.

According to the backlash reducing units 700 and 700' according to the first and second exemplary embodiments which are configured as described above, the first serrated portion 700A and the second serrated portion 700B mesh with each other at the initial time as illustrated in FIG. 14A, and then, when the planetary gear housing 360 is rotated in one direction by rotational force provided by the drive unit 700, the first serrated portion 700A and the second serrated portion 700B are about to be spaced apart from each other at a predetermined distance by rotational force with high torque in the axial direction due to the backlash caused by clearance between female and male spline gear teeth 373 and 193 formed on the rotary stabilizer bar 190 and the insertion hole 376. However, in this case, since coupling force generated by the coupling nut 195 coupled to the outer circumferential surface of the rotary stabilizer bar 190 is further increased, the backlash due to the spline gear connection between the rotary stabilizer bar 190 and the insertion hole 376 is reduced, thereby rapidly reducing the occurrence of noise.

An operational process according to the exemplary embodiment of the active rotary stabilizer for a vehicle according to the present invention, which is configured as described above, will be briefly described with reference to the accompanying drawings.

Figure 16:
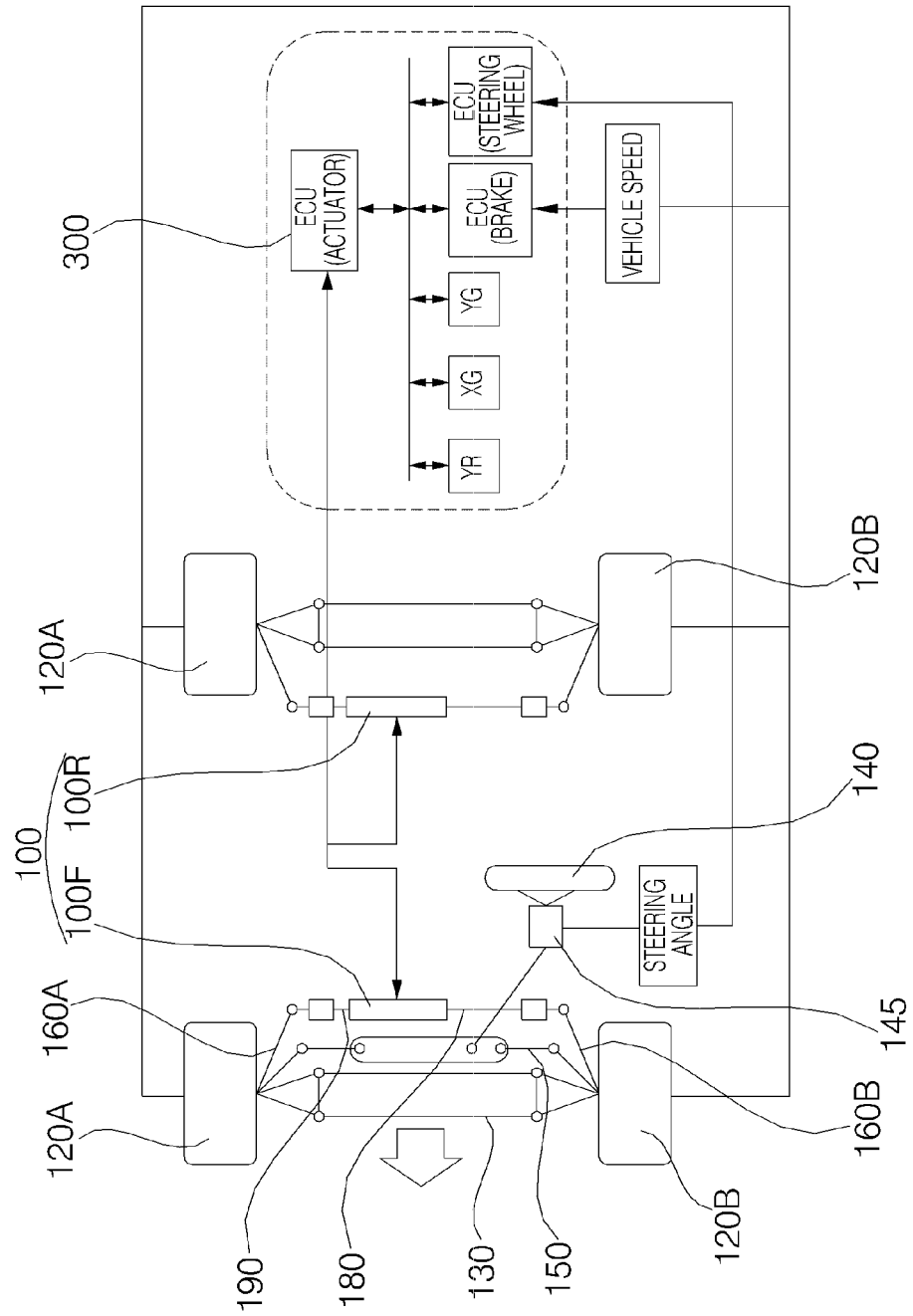
FIG. 16 is a systematic schematic view for explaining a process of operating the active rotary stabilizer for a vehicle in FIG. 6.

FIG. 16 is a systematic schematic view for explaining a process of operating the active rotary stabilizer for a vehicle in FIG. 6.

First, as illustrated in FIG. 16, the actuator 100, which constitutes the active rotary stabilizer for a vehicle according to the present invention, may be provided, one on each side, between left and right front wheels 120A and 120B and between left and right rear wheels 120A and 120B of the vehicle.

Hereinafter, for ease of description, an actuator 100 provided at the front side is referred to as a "front actuator 100F", and an actuator 100 provided at the rear side is referred to as a "rear actuator 100R". Because both of the front actuator 100F and the rear actuator 100R have the same specific configuration of the actuator 100, only the front actuator 100F will be described, and a description of the rear actuator 100R will be omitted. The term "actuator" without a separate modifier such as the "front" and the "rear" needs to be understood as either of the "front actuator 100" and the "rear actuator 100".

A tie rod link 150 is provided to be elongated along a cross member 145 positioned at the lower side of the vehicle body 110, and the tie rod link 150 is operated by a steering wheel 140 that is manipulated and rotated by a user in the vehicle. A steering angle sensor 145, which senses a rotation angle of the steering wheel 140, is provided in the steering wheel 140, and a yaw rate (YR) sensor which senses rotation of the vehicle body 110 about a vertical axis (that is, Z-axis), an XG sensor which senses forward and rearward acceleration of the vehicle body 110, and a YG sensor which determines acceleration in a width direction of the vehicle are provided where appropriate in the vehicle body 110. In addition, a wheel speed sensor, which senses a traveling speed of the vehicle, a traveling state of the vehicle such as forward movement, rearward movement, turning, and stopping, particularly, a vehicle speed, may be provided at each of the left and right front wheels 120A and 120B and the left and right rear wheels 120A and 120B.

Further, in the vehicle, there are provided a steering control unit (steer ECU) which controls a steering state of the steering wheel, a brake control unit (brake ECU) which controls an operation associated with a brake such as an ABS and an ESC, and an actuator control unit (ECU for actuator) 800 which controls operations of the front actuator 100F and the rear actuator 100R based on information values input from the respective sensors, the steering control unit (steer ECU) and the brake control unit (brake ECU).

While the vehicle is traveling, the actuator control unit 800 accurately determines the current traveling state of the vehicle body 110 by using the steering angle sensor, the wheel speed sensor, the YR sensor, the XG sensor, and the YG sensor, and controls the operations of the front actuator 100F and the rear actuator 100R in order to output rotational force with predetermined torque adapted to the current traveling state.

When electricity is supplied to the drive unit 200, strong rotational force is produced between the rotor 220 and the stator 210, the produced rotational force of the rotor 220 is transmitted to the sun gear 310 of the planetary gear reduction unit 300 at one side, and the sun gear 310 is rotated while allowing the plurality of planet gears 320 at the periphery of the sun gear 310 to revolve around the sun gear 310, and the planetary gear housing 360 is rotated by the planet gears 320 that revolve around the sun gear 310.

When the planetary gear housing 360 is rotated, the rotary stabilizer bar 190, which is coupled to the insertion hole 376 of the carrier output end 331 in the spline gear connection manner, is rotated by receiving rotational force with high torque. In the present invention, the housing 105, which accommodates the drive unit 200 and the planetary gear reduction unit 300, is configured as the rotary type, and as a result, due to rotational force produced by the drive unit 700, the rotational force is uniformly provided to the rotary stabilizer bar 190 and the fixed stabilizer bar 180, which are disposed at both left and right sides based on the housing 105, thereby preventing rolling motion of the vehicle body 110.

Of course, the operation of the front actuator 100F may also be applied to the rear actuator 100R as it is, and the operations of the front actuator 100F and the rear actuator 100R may be separately controlled depending on information input from the wheels adjacent to the front actuator 100F and the rear actuator 100R.

Hereinafter, an exemplary embodiment of a stabilizer bar link assembly of the active rotary stabilizer for a vehicle according to the present invention will be described in detail with reference to the accompanying drawings.

Figure 17:
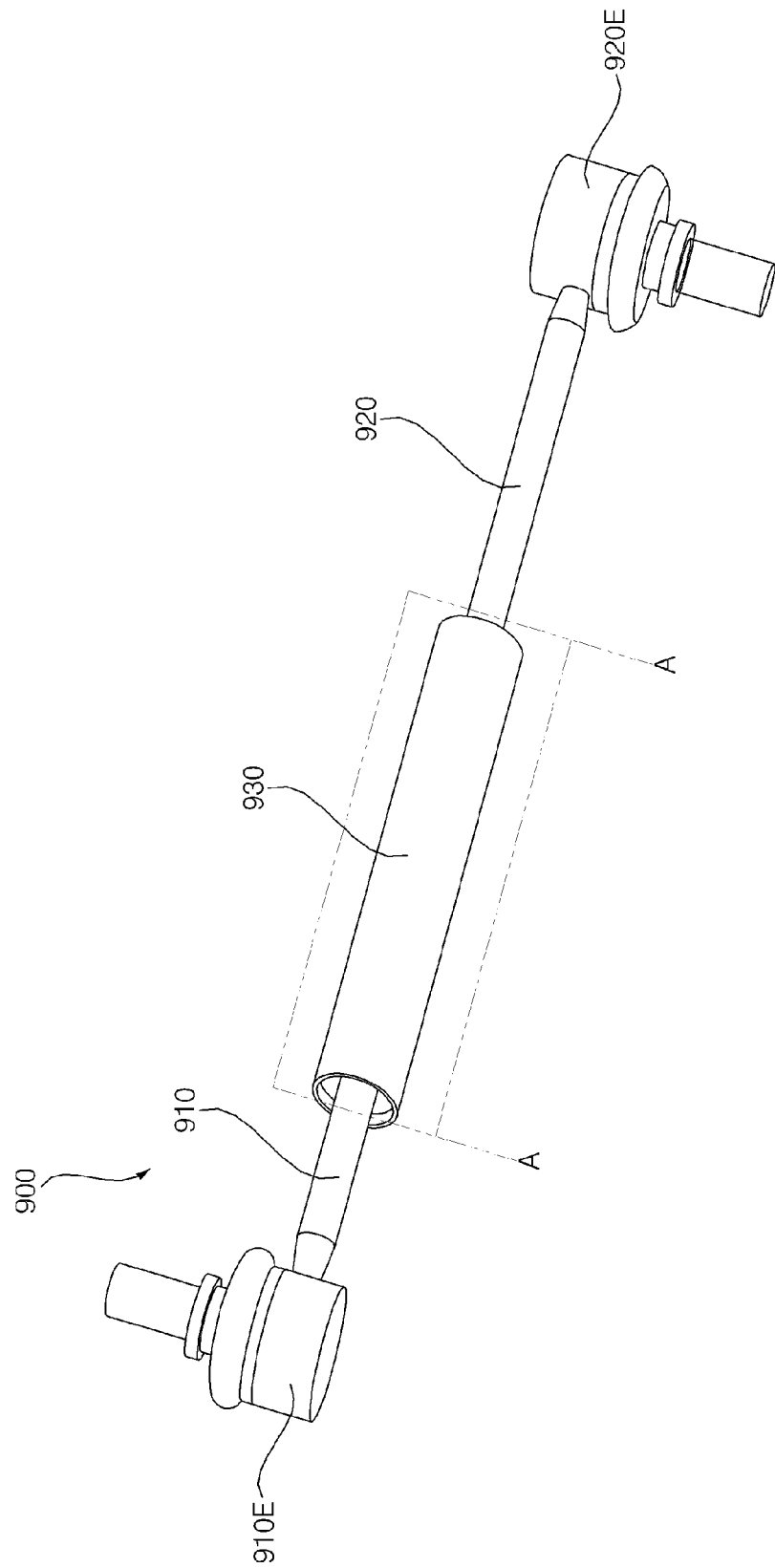
FIG. 17 is a perspective view illustrating a stabilizer bar link assembly of the active rotary stabilizer for a vehicle according to the present invention.
Figure 18:
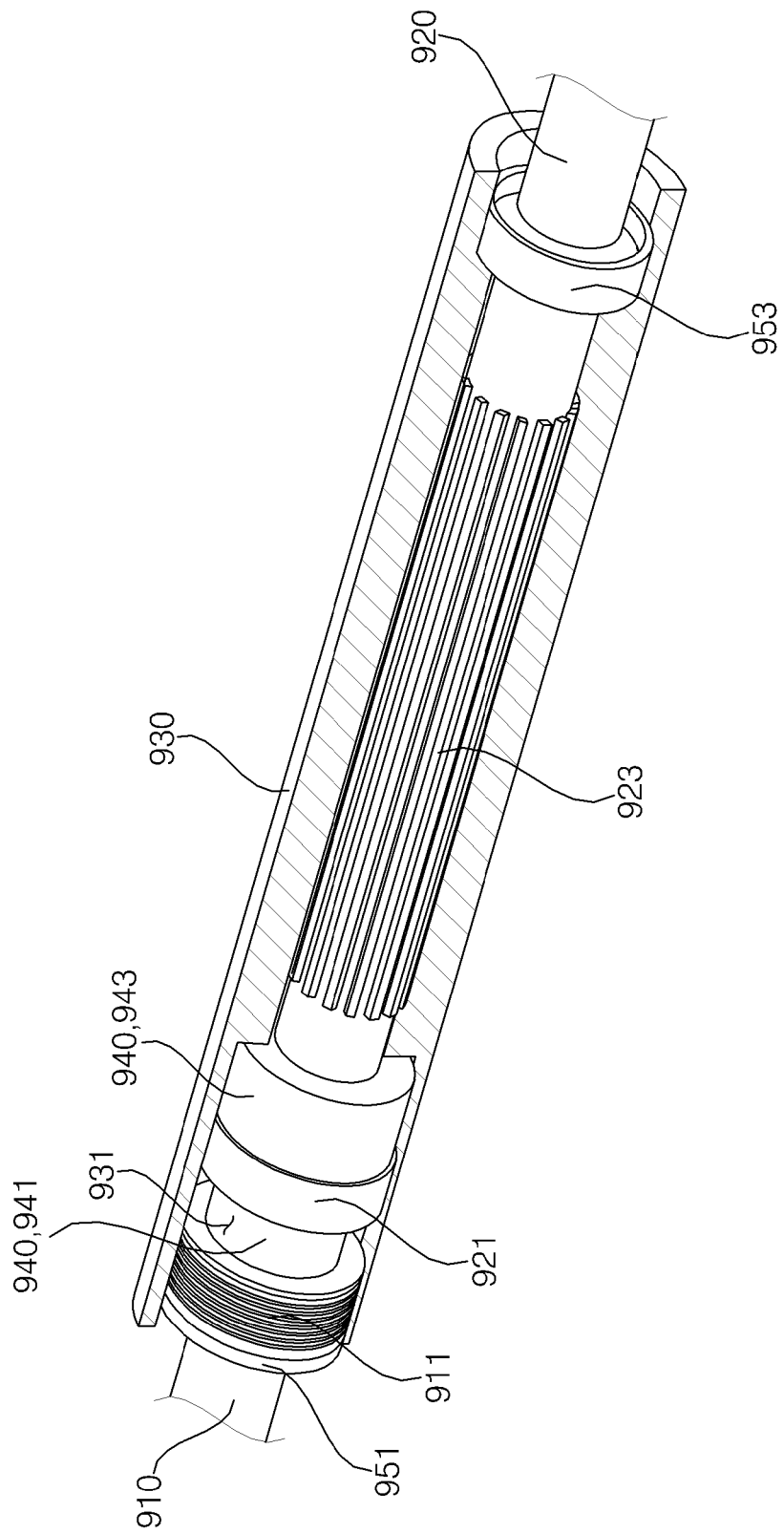
FIG. 18 is a partially cut-away perspective view taken along line A-A of FIG. 17.
Figure 19:
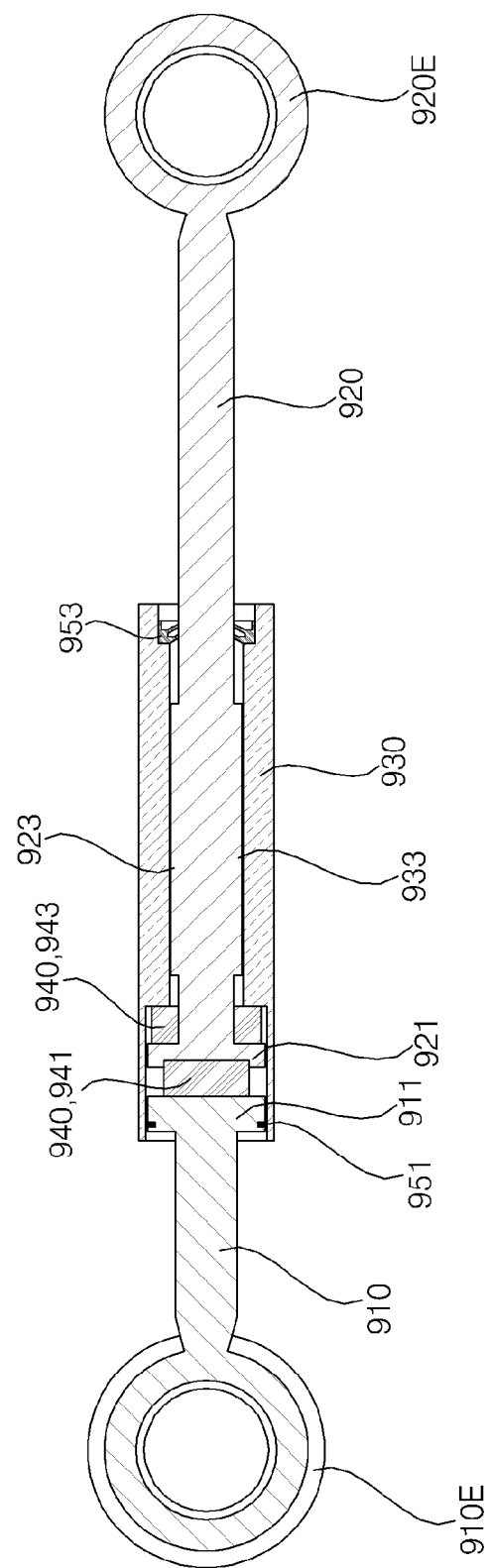
FIG. 19 is a cross-sectional view taken along line A-A of FIG. 17.
Figure 20:
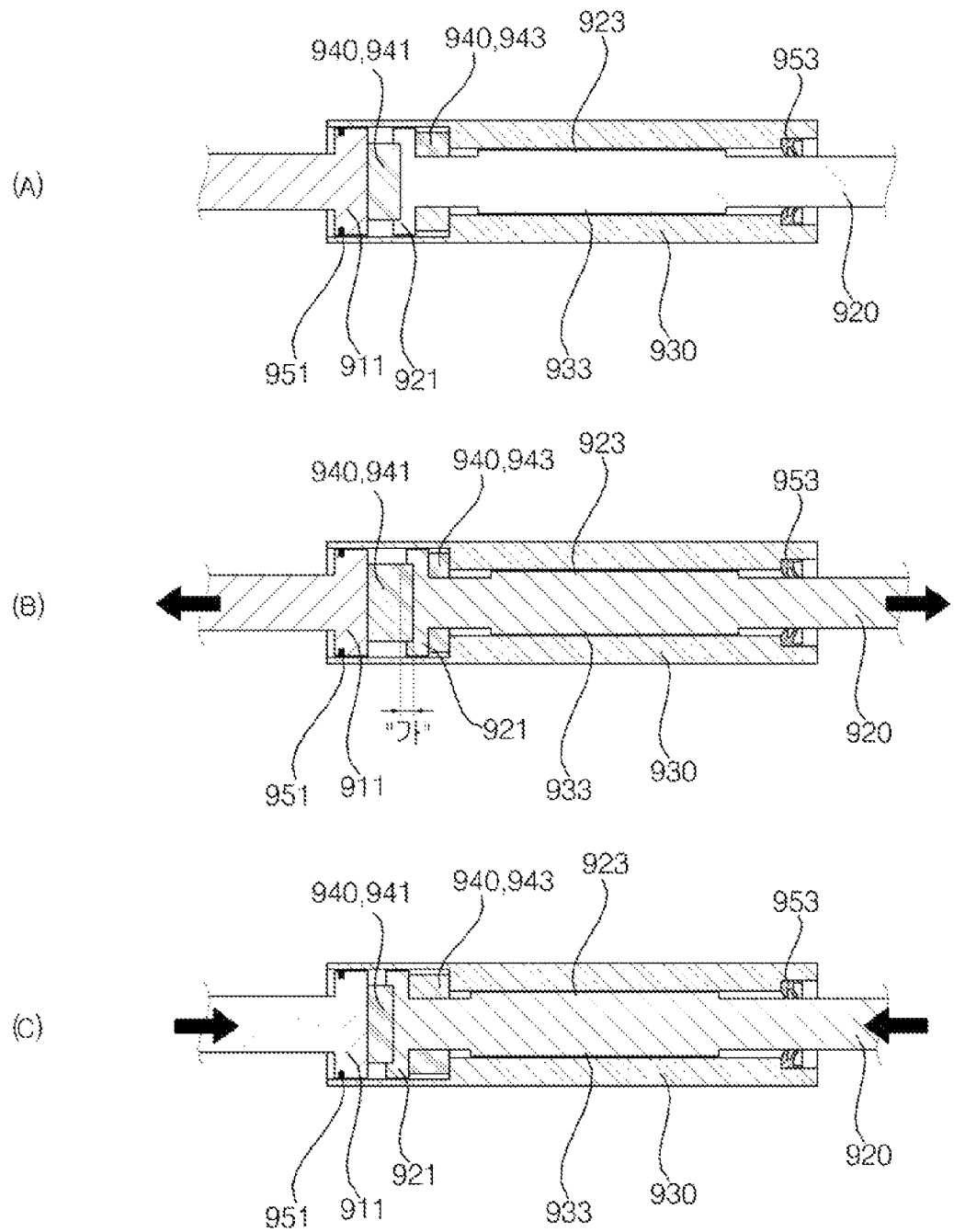
FIG. 20 is a cross-sectional view illustrating an operational process of FIG. 17.

FIG. 17 is a perspective view illustrating a stabilizer bar link assembly of the active rotary stabilizer for a vehicle according to the present invention, FIG. 18 is a partially cut-away perspective view taken along line A-A of FIG. 17, FIG. 19 is a cross-sectional view taken along line A-A of FIG. 17, and FIG. 20 is a cross-sectional view illustrating an operational process of FIG. 17.

According to an exemplary embodiment of a stabilizer bar link assembly 600 of the active rotary stabilizer for a vehicle according to the present invention, an anti-torque prevention unit 900 is provided in the stabilizer bar link assembly 600 in order to prevent the drive unit including the motor from being damaged and deteriorating in terms of performance due to reversed torsional force that is reversely transmitted from the road surface to the actuator 100 while the vehicle is traveling, and to prevent deterioration in ride comfort for an occupant seated in the vehicle.

The exemplary embodiment of the stabilizer bar link assembly 600 according to the present invention includes an upper link 910, a lower link 920, and the anti-torque prevention unit 900.

In more detail, as illustrated in FIG. 17, one end 910E of the upper link 910 is connected to the fixed stabilizer bar 180 or the rotary stabilizer bar 190 that generates torsional force by receiving predetermined rotational force from the actuator 100 disposed between the left and right wheels 120A and 120B of the vehicle body 110, and the other end (no reference numeral) of the upper link 910 may extend downward at a predetermined length.

As illustrated in FIG. 17, one end (no reference numeral) of the lower link 920 is disposed to be adjacent to the other end of the upper link 910 and receives torsional force transmitted from the fixed stabilizer bar 180 or the rotary stabilizer bar 190 to the upper link 910, and the other end 920E of the lower link 920 may be connected to any one of left and right lower arms 130A and 130B connected to the left and right wheels 120A and 120B of the vehicle body 110.

Meanwhile, the anti-torque prevention unit 900 is disposed to accommodate both of the other end of the upper link 910 and the one end of the lower link 920, and serves to prevent reversed torsional force from being reversely transmitted from the left and right lower arms 130A and 130B.

As illustrated in FIG. 18, the anti-torque prevention unit 900 may include a link housing 930 which accommodates both of the other end of the upper link 910 and the one end of the lower link 920, and a shock absorbing member 940 which is disposed in the link housing 930 and absorbs transmission force transmitted through the upper link 910 and the lower link 920.

The link housing 930 may be formed to be elongated in a nearly longitudinal direction thereof, and may be formed to have a length longer than a half of the sum of the lengths of the upper link 910 and the lower link 920. In particular, the link housing 930 may be formed to have a length that may allow a half or more than a half of the lower link 920 to be inserted into the link housing 930 so that the lower link 920 is not bent by rotational force in a rotation direction of the stabilizer bar link assembly 600 when the stabilizer bar link assembly 600 is rotated.

A cylinder portion 931, which is a predetermined space, may be formed in the link housing 930. The cylinder portion 931 may be formed at one end of the link housing 930 which is close to the upper link 910 in the link housing 930.

Meanwhile, catching portions 911 and 921, which have larger outer diameters than the other end of the upper link 910 and the one end of the lower link 920 and serve as pistons that are provided to be movable in the longitudinal direction of the link housing 930 along an inner diameter of the cylinder portion 931 inside the cylinder portion 931, may be formed at the other end of the upper link 910 and the one end of the lower link 920, respectively.

The catching portions 911 and 921 are moved like a piston in the cylinder portion 931, and serves to lengthen and shorten the overall length of the stabilizer bar link assembly 600 according to the present invention.

The shock absorbing member 940 may be disposed in the cylinder portion 931. In more detail, as illustrated in FIG. 18, the cylinder portion 931 may include compressive rubber 941 which is disposed between the catching portion 911 of the upper link 910 and the catching portion 921 of the lower link 920, and tensile rubber 943 which is disposed on an outer circumferential surface of the lower link 920 and disposed to be caught by an inner wall at one side of the cylinder portion 931.

When force, which is transmitted when the overall length of the stabilizer bar link assembly 600 according to the present invention is lengthened due to reversed torsional force reversely transmitted from an uneven road surface, is defined as tensile force, and force, which is transmitted when the overall length of the stabilizer bar link assembly 600 is shortened on the contrary, is defined as compressive force, rubber, which is compressed when the tensile force is applied, is called the aforementioned tensile rubber 943, and rubber, which is compressed when the compressive force is applied, is called the aforementioned compressive rubber 941.

That is, both of the compressive rubber 941 and the tensile rubber 943 absorb reversed torsional force while being compressed in the cylinder portion 931 by the catching portion 911 of the upper link 910 and the catching portion 921 of the lower link 920, but the terms "compressive rubber and tensile rubber" are merely defined depending on the type of applying force, and it should be noted that the scope of the present invention is not limited by the terms.

As illustrated in FIG. 18, a through portion 935, which is in communication with the cylinder portion 931 and through which the lower link 920 passes, may be further formed in the link housing 930. In a case in which the cylinder portion 931 is formed to be close to one end of the link housing 930, the through portion 935 may be penetratively formed from the cylinder portion 931 to the other end of the link housing 930.

The lower link 920, between the upper link 910 and the lower link 920, may be installed to be inserted into and to pass through the through portion 935. As described above, a half or more than a half of the lower link 920 based on the overall length of the lower link 920 is inserted into the through portion 935, and as a result, the through portion 935 serves to support the lower link 920 so that the lower link 920 is not bent by the rotational force.

Meanwhile, the lower link 920 is installed in the through portion 935 in a spline gear connection manner so that the overall length of the stabilizer bar link assembly 600 according to the present invention may be lengthened or shortened by reversed torsional force reversely transmitted from an uneven road surface. In more detail, female spline gear teeth 933 of the spline gear teeth may be formed on an inner circumferential surface of the through portion 935, and male spline gear teeth 923, which mesh with the female spline gear teeth 933, may be formed on an outer circumferential surface of the lower link 920.

A process of assembling the stabilizer bar link assembly of the active rotary stabilizer for a vehicle according to the present invention, which is configured as described above, will be briefly described below.

First, when the lower link 920 is installed in the link housing 930, the lower link 920 is inserted at a side of the cylinder portion 931, which is opened toward the one end of the link housing 930, passes through the cylinder portion 931, and then is coupled to protrude from the other end of the link housing 930 which is opposite to the cylinder portion 931.

In this case, the tensile rubber 943, which is disposed on the outer circumferential surface of the lower link 920 that is penetratively installed in the cylinder portion 931, is positioned between the catching portion 921 of the lower link 920 and an inner wall at one side of the cylinder portion 931.

Next, the compressive rubber 941 is disposed in the cylinder portion 931 so as to be in contact with an outer surface of the catching portion 921 of the lower link 920.

Further, an external threaded portion (no reference numeral) formed on an outer circumferential surface of the catching portion 911 of the upper link 910 is coupled to an internal threaded portion (no reference numeral) formed on an inner circumferential surface at an opened end side of the cylinder portion 931, and as a result, the upper link 910 is coupled to an opened portion of the cylinder portion 931 in a threaded connection manner.

In this case, the upper link 910 may be coupled to one end of the link housing 930 so that the compressive rubber 941 is compressed to a certain degree as an appropriated amount of load is applied to the compressive rubber 941 by the catching portion 911 of the upper link 910. Accordingly, when the compressive rubber 941 and the tensile rubber 943 are compressed by an interaction between the upper link 910 and the lower link 920, no vacant space is formed in the cylinder portion 931, thereby absorbing traveling vibration that is consistently transmitted even when the vehicle normally travels.

As described above, the compressive rubber 941 is interposed between an outer surface of the catching portion 911 of the upper link 910 and an outer surface of the catching portion 921 of the lower link 920 and between the catching portion 921 of the lower link 920 and the inner wall at one side of the cylinder portion 931, and absorbs reversed torsional force when the overall length of the stabilizer bar link assembly 600 according to the present invention is lengthened or shortened by an interaction between the upper link 910 and the lower link 920 which is caused by reversed torsional force reversely transmitted from an uneven road surface.

Meanwhile, at one end of the link housing 930, an O-ring 951, which is disposed on the catching portion 911 of the upper link 910, may prevent foreign substances from entering the cylinder portion 931 or the link housing 930, and at the other end of the link housing 930, a sealing ring 953, which is interposed between the link housing 930 and the outer circumferential surface of the lower link 920, may prevent foreign substances from entering the cylinder portion 931 or the link housing 930.

The O-ring 951 is suitable to block an inflow of foreign substances between fixed objects, and the sealing ring 953 is suitable to block an inflow of foreign substances between a fixed object and a moving object. Therefore, in the exemplary embodiment of the stabilizer bar link assembly 600 of the active rotary stabilizer for a vehicle according to the present invention, the O-ring 951 is interposed between the link housing 930 and the upper link 910 that is completely fixedly coupled to the link housing 930, and the sealing ring 953 is interposed between the link housing 930 and the lower link 920 that is relatively fixedly coupled to the link housing 930.

Meanwhile, the one end of the upper link 910 and the other end of the lower link 920 may be rotatably connected to the fixed stabilizer bar 180 or the rotary stabilizer and the lower arms 130A and 130B of the vehicle body 110 by means of rotary bushings.

In more detail, the one end of the upper link 910 may be rotatably connected to the fixed stabilizer bar 180 or the rotary stabilizer bar 190 by means of a rotary bushing, and the other end of the lower link 920 may be rotatably connected to the lower arms 130A and 130B of the vehicle body 110 by means of a rotary bushing (not illustrated).

A process of operating the stabilizer bar link assembly 600 of the active rotary stabilizer for a vehicle according to the present invention, which is configured as described above, will be described below with reference to the accompanying drawings (particularly, FIG. 10).

First, as illustrated in FIG. 20A, a half or more than a half of the lower link 920 based on the overall length of the lower link 920 is installed to be inserted into the link housing 930, and as a result, when the vehicle travels on a normal road surface and the lower link 920 is rotated by normal rotational force transmitted from the fixed stabilizer bar 180 or the rotary stabilizer bar 190, the lower link 920 transmits sufficient torsional force to the vehicle body 110 without being bent.

Next, when tensile force is transmitted from the outside due to an uneven road surface, the lower link 920 receives outward force, the tensile rubber 943, which is interposed between the catching portion 921 of the lower link 920 and the inner wall at one side of the cylinder portion 931, is compressed, and the compressive rubber 941 is relaxed, as illustrated in FIG. 20B, thereby absorbing impact.

On the contrary, when compressive force is transmitted from the outside due to an uneven road surface, the lower link 920 receives inward force, the compressive rubber 941, which is interposed between the catching portion 921 of the lower link 920 and the catching portion 911 of the upper link 910, is compressed, and the tensile rubber 943 is relaxed, as illustrated in FIG. 20C, thereby absorbing impact.

As the foregoing, the exemplary embodiments of the active rotary stabilizer and the stabilizer bar link assembly for a vehicle according to the present invention have been described in detail with reference to the accompanying drawings. However, the present invention is not limited by the aforementioned exemplary embodiments, and it is obvious to those skilled in the art to which the present invention pertains that numerous variations and equivalent exemplary embodiments may be made. Thus, the true protection scope of the present invention will be determined by the appended claims.

What is claimed is:

1. An active rotary stabilizer for a vehicle, comprising:
    a housing which has a predetermined space therein, one side, and an other side opposite to the one side;
    a drive unit positioned in the housing at the one side and including a stator and a rotor;
    a first reduction unit which is provided in the housing at the other side, is disposed to be adjacent to the drive unit, receives rotational force from the drive unit, and primarily reduces the rotational force at a predetermined ratio;
    a second reduction unit which is provided at the other side in the housing, receives the primarily reduced rotational force from an output portion of the first reduction unit, and secondarily reduces the rotational force at a predetermined ratio;
    a drive unit cover which is coupled to and seals the one side of the housing, wherein the drive unit cover comprises a recess formed at an inner surface of the drive unit cover, and a bearing installed in the recess and rotatably supporting an end portion of the rotor;
    a fixed stabilizer bar which is welded on the drive unit cover at an outer surface of the drive unit, rotates in conjunction with the housing, and provides predetermined torsional force to one side of a vehicle body of a vehicle that turns; and
    a rotary stabilizer bar which is coupled to an output end that protrudes toward the other side of the housing adjacent to the second reduction unit, rotates relative to the housing, and provides predetermined torsional force to an other side of the vehicle body of the vehicle that turns.

2. The active rotary stabilizer of claim 1, wherein
    the first reduction unit is any one of a cycloid reduction unit using a cycloid gear and a planetary gear reduction unit using a planetary gear set, and the second reduction unit is a reduction unit of the cycloid reduction unit and the planetary gear reduction unit which is different from the first reduction unit.

3. The active rotary stabilizer of claim 2, wherein a length of the cycloid reduction unit is shorter than a length of the planetary gear reduction unit.

4. The active rotary stabilizer of claim 2, wherein rotational force provided from the rotor is primarily reduced by the cycloid reduction unit, secondarily reduced by the planetary gear reduction unit, and then output.

5. An active rotary stabilizer for a vehicle, comprising:
a housing which has a predetermined space therein, one side, and an other side opposite to the one side;
a drive unit positioned in the housing at the one side and including a stator and a rotor;
a first reduction unit which is provided in the housing at the other side, is disposed to be adjacent to the drive unit, receives rotational force from the drive unit, and primarily reduces the rotational force at a predetermined ratio;
a second reduction unit which is provided at the other side in the housing, receives the primarily reduced rotational force from an output portion of the first reduction unit, and secondarily reduces the rotational force at a predetermined ratio;
a drive unit cover which is coupled to and seal the one side of the housing, wherein the drive unit cover comprises a recess formed at an inner surface of the drive unit cover, and a bearing installed in the recess and supporting an end portion of the rotor;
a fixed stabilizer bar which is welded on the drive unit cover at an outer surface of the drive unit, rotates in conjunction with the housing, and provides predetermined torsional force to one side of a vehicle body of a vehicle that turns; and
a rotary stabilizer bar which is coupled to an output end that protrudes toward the other side of the housing adjacent to the second reduction unit, rotates relative to the housing, and provides predetermined torsional force to an other side of the vehicle body of the vehicle that turns, wherein
the first reduction unit is any one of a cycloid reduction unit using a cycloid gear and a planetary gear reduction unit using a planetary gear set, and
the second reduction unit is a reduction unit of the cycloid reduction unit and the planetary gear reduction unit which is different from the first reduction unit,
wherein the cycloid reduction unit includes:
an eccentric shaft which has one end connected to the rotor, and a pair of eccentric bodies that is provided at the other end of the eccentric shaft and is eccentrically and axially connected to each other so as to be symmetrical at 180 degrees;
a pair of cycloid discs which has cycloid teeth formed along outer circumferential surfaces of the cycloid discs, a plurality of disc moving holes penetratively formed in the axial direction along the same circumference, and fixing holes that are penetratively formed at centers of the cycloid discs in the axial direction so that the pair of eccentric bodies of the eccentric shaft is sequentially inserted into and rotatably supported by the fixing holes;
an output shaft which has a plurality of input legs that is formed at one side of the output shaft and inserted into the disc moving holes, and an output sun gear portion that is formed at the other side of the output shaft, extends to a side where the planetary gear reduction unit is provided, and is rotated at a reduced speed along with the rotation of the pair of cycloid discs; and
an internal teeth portion which has internal teeth that are formed on an inner surface of the housing and engaged with the cycloid teeth of the pair of cycloid discs.

6. The active rotary stabilizer of claim 5, wherein the number of cycloid teeth formed on the pair of cycloid discs is one less than the number of internal teeth of the internal teeth portion.

7. The active rotary stabilizer of claim 5, wherein the eccentric shaft and the pair of cycloid discs perform rolling motion by means of a roller bearing interposed between the fixing holes.

8. The active rotary stabilizer of claim 5, wherein the planetary gear reduction unit includes:
a sun gear which protrudes from a center at the other end of the output shaft of the cycloid reduction unit toward the other side in the housing at a predetermined length, is rotated integrally with the output shaft, and has gear teeth formed on an outer circumferential surface thereof;
a plurality of planet gears which has gear teeth that mesh with the gear teeth of the sun gear, is disposed along an outer circumference of the sun gear, and revolves around the sun gear in accordance with the rotation of the sun gear;
a carrier unit which simultaneously receives rotational force from the plurality of planet gears, and obtains a reduction ratio at which the carrier unit is rotated at the revolution speed of the plurality of planet gears; and
a planetary gear housing which is disposed to surround the sun gear, the plurality of planet gears, and the carrier unit.

9. The active rotary stabilizer of claim 8, wherein rotational force provided from the rotor is primarily reduced by the planetary gear reduction unit, secondarily reduced by the cycloid reduction unit, and then output.

* * * * *